(12) United States Patent
Ueki

(10) Patent No.: US 8,654,622 B2
(45) Date of Patent: Feb. 18, 2014

(54) INFORMATION RECORDING MEDIUM, AND RECORDING METHOD AND REPRODUCING METHOD THEREOF

(71) Applicant: JVC Kenwood Corporation, Kanagawa-ku (JP)

(72) Inventor: Yasuhiro Ueki, Sagamihara (JP)

(73) Assignee: JVC Kenwood Corporation, Yokohama (JP)

( * ) Notice: Subject to any disclaimer, the term of this patent is extended or adjusted under 35 U.S.C. 154(b) by 0 days.

(21) Appl. No.: 13/941,582

(22) Filed: Jul. 15, 2013

(65) Prior Publication Data

US 2013/0301399 A1 Nov. 14, 2013

Related U.S. Application Data

(63) Continuation of application No. 13/668,878, filed on Nov. 5, 2012, now Pat. No. 8,503,280, which is a continuation of application No. 13/423,806, filed on Mar. 19, 2012, now Pat. No. 8,325,587, which is a continuation of application No. 13/037,967, filed on Mar. 1, 2011, now Pat. No. 8,159,926, which is a continuation of application No. 12/512,504, filed on Jul. 30, 2009, now Pat. No. 7,920,460, which is a continuation of application No. 11/923,155, filed on Oct. 24, 2007, now Pat. No. 7,586,832, which is a continuation of application No. 11/306,063, filed on Dec. 15, 2005, now Pat. No. 7,310,300, which is a continuation of application No. 11/131,424, filed on May 18, 2005, now Pat. No. 7,023,791, which is a continuation of application No. 09/854,557, filed on May 15, 2001, now Pat. No. 6,965,555.

(30) Foreign Application Priority Data

May 17, 2000 (JP) .............................. 2000-145353
Aug. 23, 2000 (JP) .............................. 2000-252827

(51) Int. Cl.
*G11B 7/24* (2013.01)

(52) U.S. Cl.
USPC .................... 369/275.3; 369/30.1; 369/44.26; 369/53.35

(58) Field of Classification Search
USPC ............ 369/275.1, 275.3, 30.1, 44.26, 53.35, 369/53.36, 53.37, 53.11, 53.21, 277, 276
See application file for complete search history.

(56) References Cited

U.S. PATENT DOCUMENTS

| | | |
|---|---|---|
| 5,923,640 A | 7/1999 | Takemura et al. |
| 6,128,272 A | 10/2000 | Horimai et al. |
| 6,215,758 B1 | 4/2001 | Horimai et al. |
| 6,594,224 B2 | 7/2003 | Muramatsu et al. |
| 6,671,249 B2 | 12/2003 | Horie |
| 6,728,170 B2 | 4/2004 | Ueki |
| 6,853,615 B1 | 2/2005 | Spruit et al. |

(Continued)

*Primary Examiner* — Ali Neyzari
(74) *Attorney, Agent, or Firm* — Novak Druce Connolly Bove + Quigg LLP

(57) ABSTRACT

An information recording medium in which bottoms of a guide groove and a pit array formed on a disc substrate are allocated on a same flat plane and shaped in flat. Further, in a transition area from a pit array to a guide groove or from a guide groove to a pit array, the information recording medium is provided with an intermediate area composed of a pit array of which height changes from a height between a bottom and a side of a groove to another height between the bottom and a side of the pit array.

5 Claims, 16 Drawing Sheets

(56) References Cited

U.S. PATENT DOCUMENTS

| | | |
|---|---|---|
| 6,965,555 B2 | 11/2005 | Ueki |
| 7,020,067 B2 | 3/2006 | Ueki |
| 7,023,791 B2 | 4/2006 | Ueki |
| 7,310,299 B2 | 12/2007 | Ueki |
| 7,310,300 B2 | 12/2007 | Ueki |
| 7,313,081 B2 | 12/2007 | Ueki |
| 7,315,507 B2 | 1/2008 | Ueki |
| 7,573,804 B2 | 8/2009 | Ueki |
| 7,577,081 B2 | 8/2009 | Ueki |
| 7,580,337 B2 | 8/2009 | Ueki |
| 7,580,338 B2 | 8/2009 | Ueki |
| 7,583,581 B2 | 9/2009 | Ueki |
| 7,586,832 B2 | 9/2009 | Ueki |
| 7,596,074 B2 | 9/2009 | Ueki |
| 7,920,460 B2 | 4/2011 | Ueki |
| 8,159,926 B2 | 4/2012 | Ueki |
| 8,325,587 B2 | 12/2012 | Ueki |
| 8,432,784 B2 * | 4/2013 | Ueki ............... 369/275.3 |
| 8,503,280 B2 * | 8/2013 | Ueki ............... 369/275.3 |
| 2006/0198282 A1 | 9/2006 | Ueki |
| 2006/0198284 A1 | 9/2006 | Ueki |
| 2006/0198285 A1 | 9/2006 | Ueki |

* cited by examiner

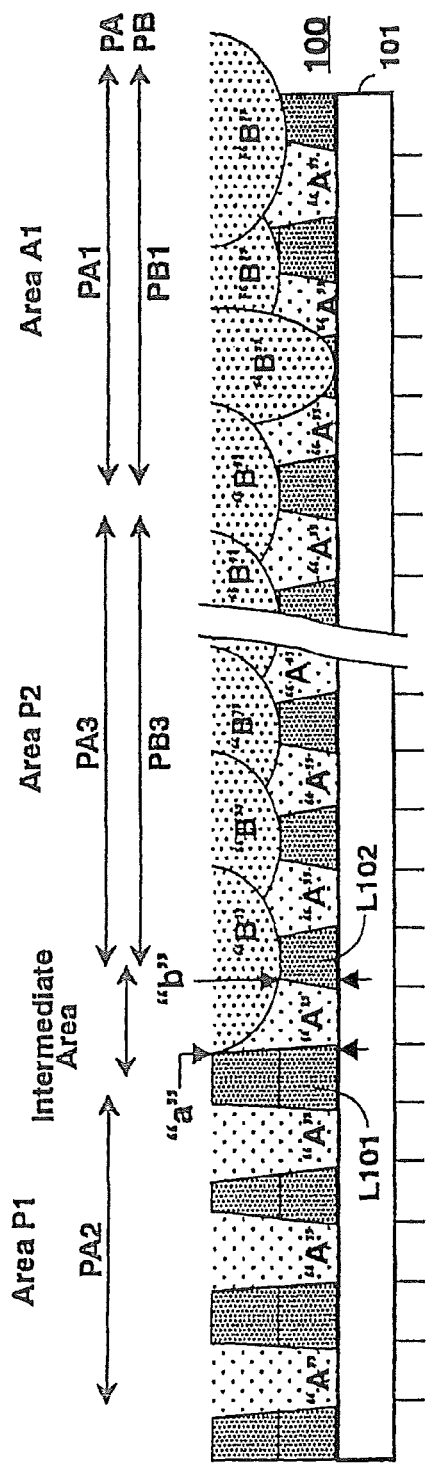
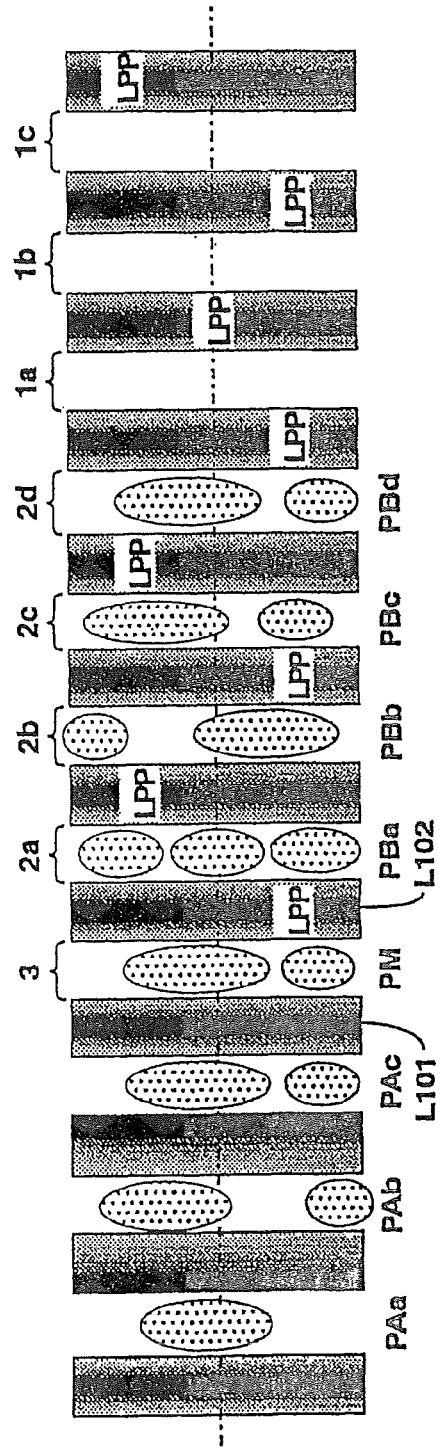
Fig. 1(a)
Fig. 1(b)

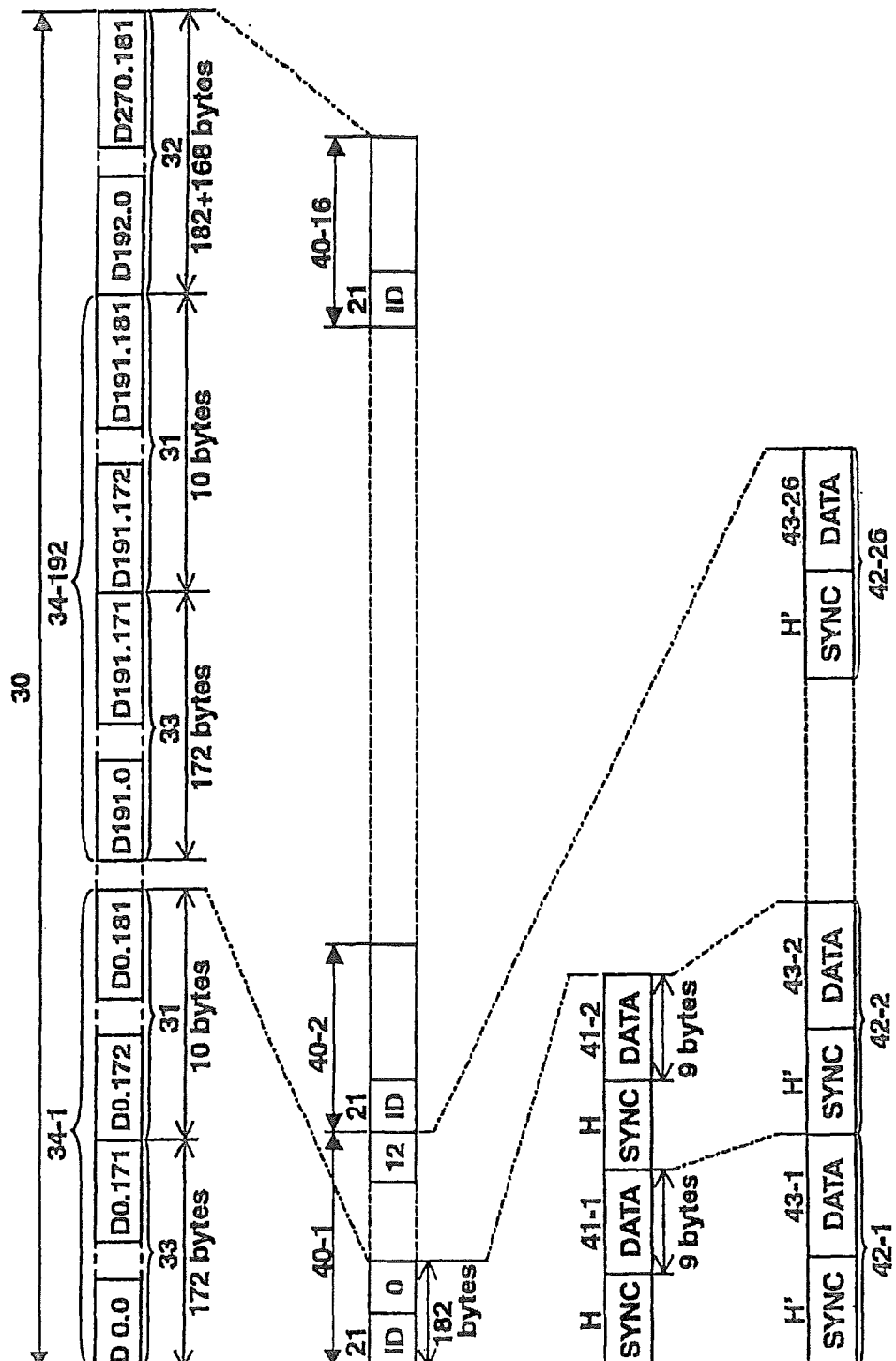

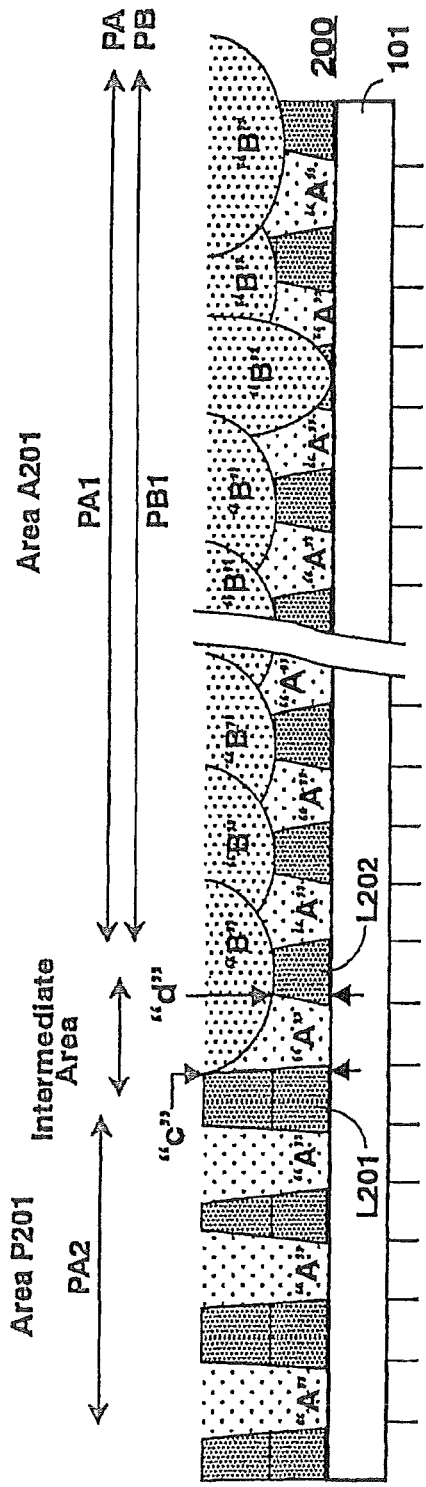
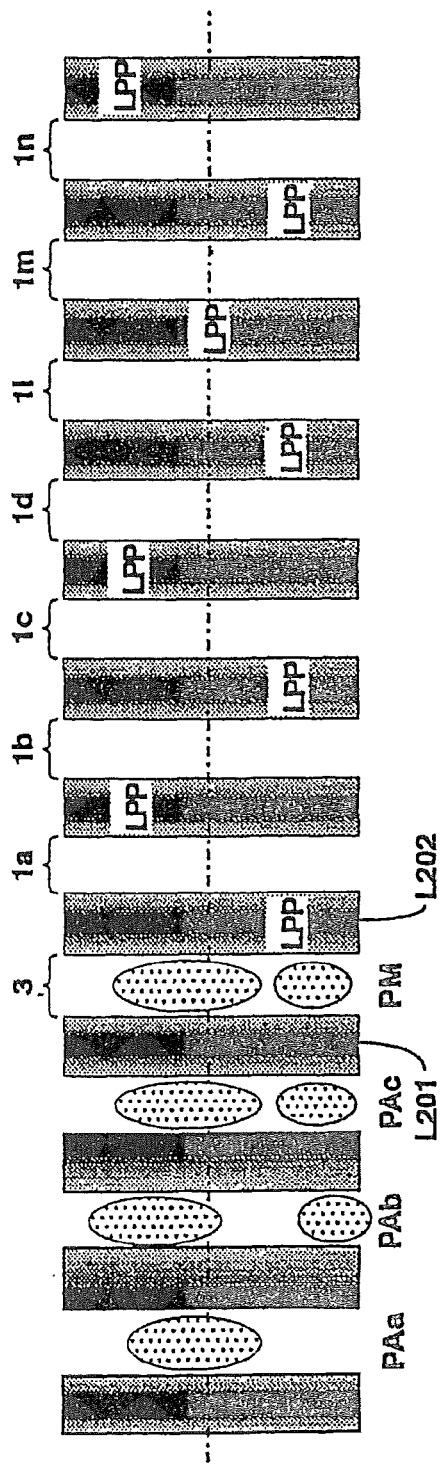
Fig. 6(a)
Fig. 6(b)

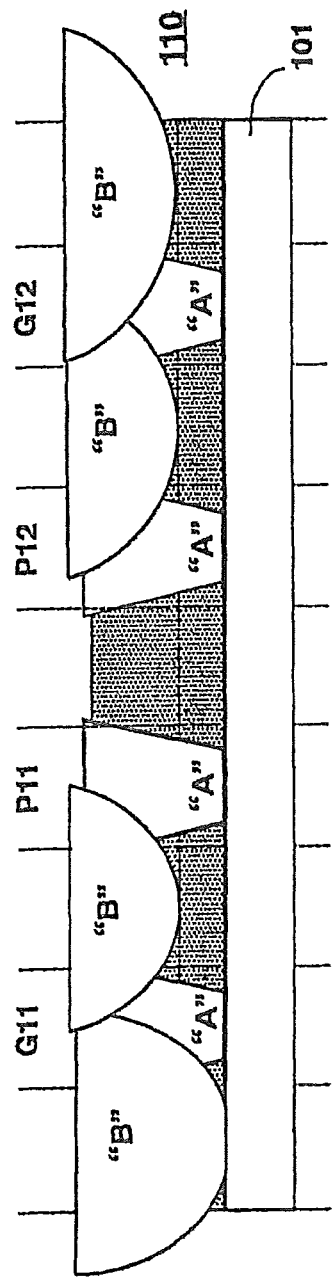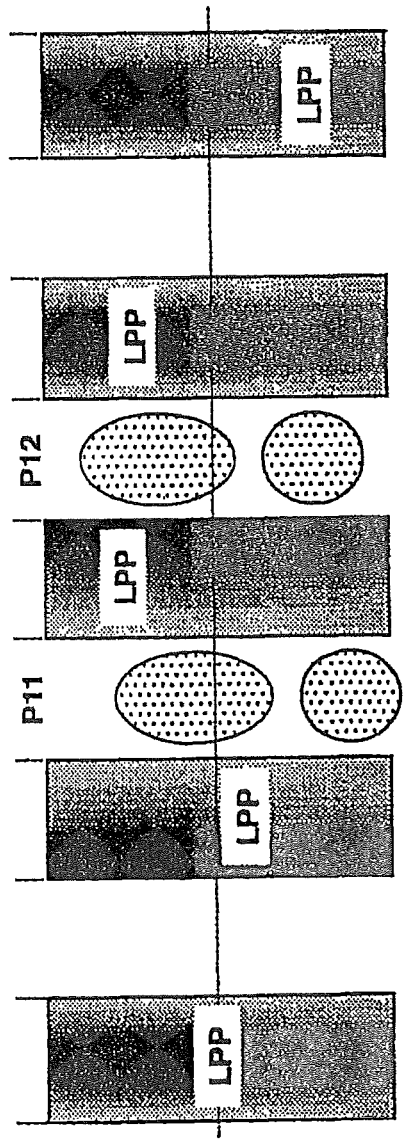
Fig. 7(a)
Fig. 7(b)

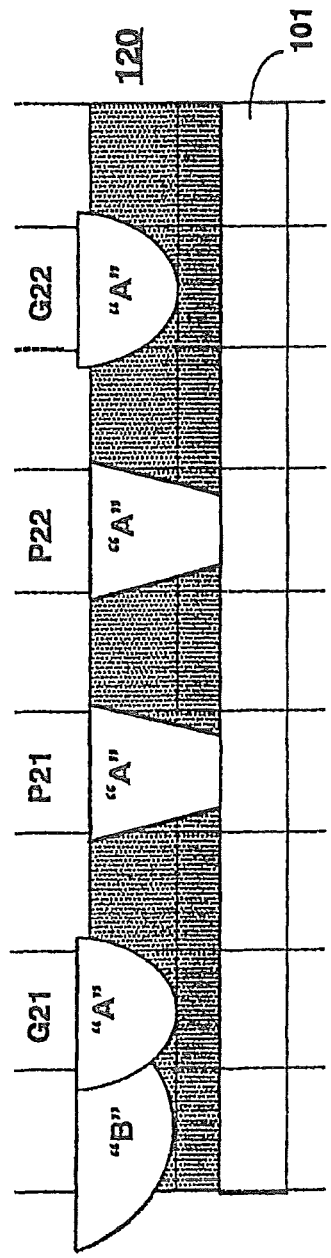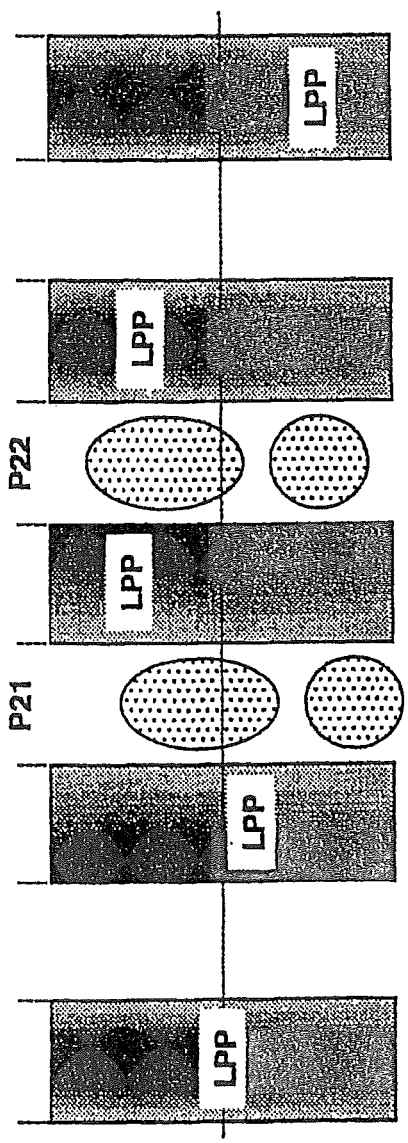
Fig. 8(a)
Fig. 8(b)

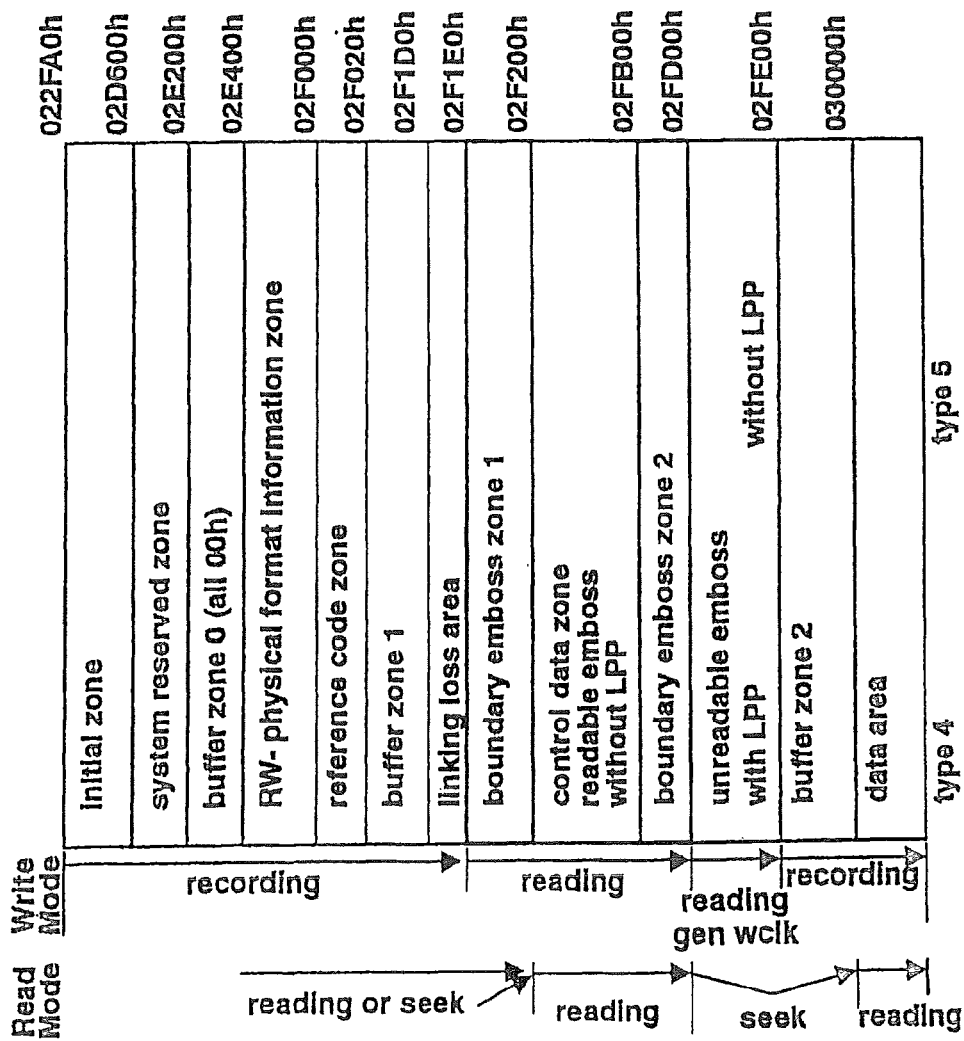

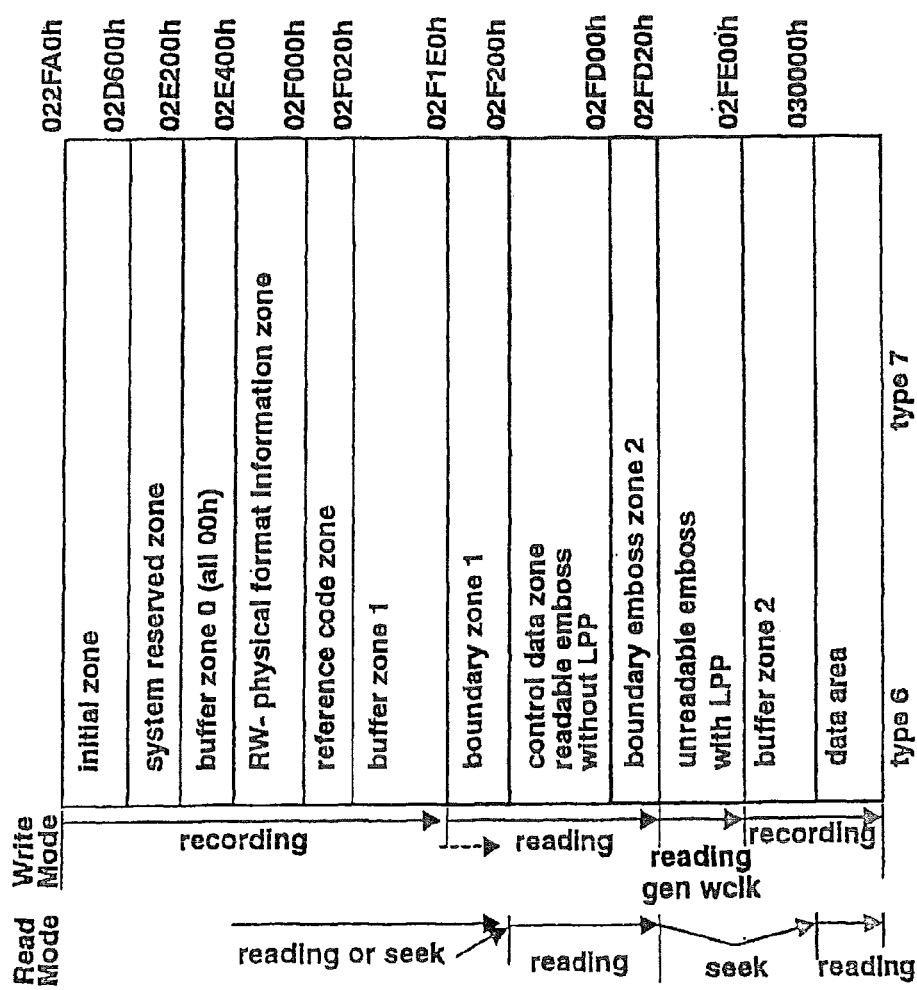

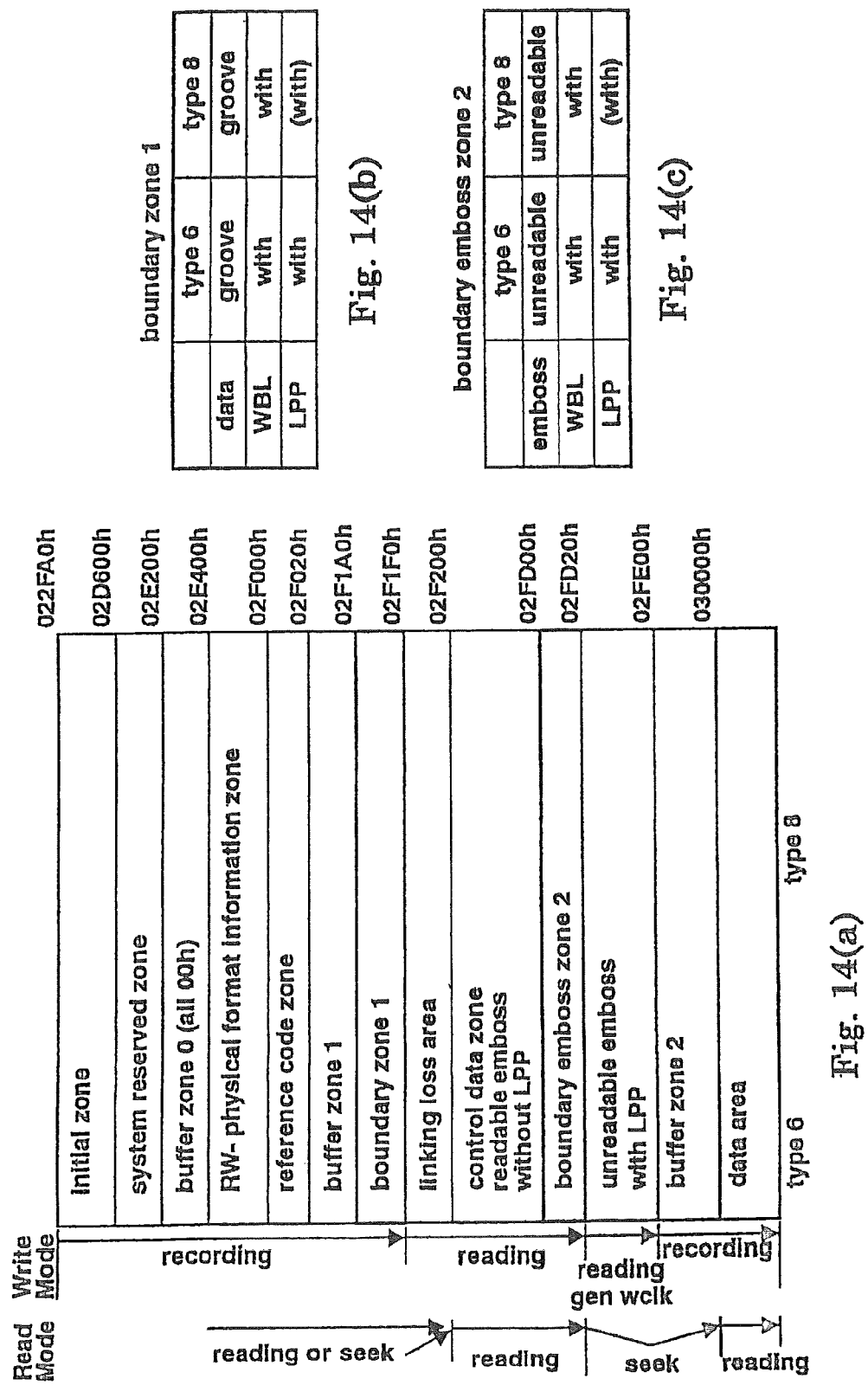

INFORMATION RECORDING MEDIUM, AND RECORDING METHOD AND REPRODUCING METHOD THEREOF

RELATED APPLICATIONS

This application is a continuation application of application Ser. No. 13/668,878, filed Nov. 5, 2012 (now allowed), which is a continuation application of application Ser. No. 13/423,806, filed Mar. 19, 2012 (now U.S. Pat. No. 8,325,587), which is a continuation application of application Ser. No. 13/037,967, filed Mar. 1, 2011 (now U.S. Pat. No. 8,159,926), which is a continuation application of application Ser. No. 12/512,504, filed Jul. 30, 2009 (now U.S. Pat. No. 7,920,460), which is a continuation of application Ser. No. 11/923,155, filed Oct. 24, 2007 (now U.S. Pat. No. 7,586,832), which is a continuation application of application Ser. No. 11/306,063, filed Dec. 15, 2005 (now U.S. Pat. No. 7,310,300), which is a continuing application of application Ser. No. 11/131,424, filed May 18, 2005 (now U.S. Pat. No. 7,023,791), which is a continuing application of application Ser. No. 09/854,557, filed on May 15, 2001 (now U.S. Pat. No. 6,965,555), and for which priority is claimed under 35 U.S.C. §120; and this application claims priority of Application No. 2000-145353 filed in Japan on May 17, 2000 and Application No. 2000-252827 filed in Japan on Aug. 23, 2000 under 35 U.S.C. §119. The entire contents of all are hereby incorporated by reference.

BACKGROUND OF THE INVENTION

1. Field of the Invention

The present invention relates to an information recording medium, and a recording method and a reproducing method thereof, wherein the information recording medium is composed of a recording/reproducing area provided with a guide groove and a groove and a read only area formed with a pit array, and further, the information recording medium is formed with an address information of the recording/reproducing area on a land provided between guide grooves as a land pre-pit (hereinafter referred to LPP), and particularly, relates to an information recording medium enabling to be recorded and reproduced such as a DVD-RW (Digital Versatile Disc for Re-recordable) disc, and a recording method and a reproducing method thereof.

2. Description of the Related Art

Generally, in a high density recordable optical disc (hereinafter abbreviated as a recordable optical disc) such as a DVD-RW disc, which is interchangeable with a DVD video disc and can be recorded a plurality of times, a contents to be protected by copyright and other contents must be identified and prevented from illegal copying of the contents so as not to be recorded or reproduced. Basically, a DVD-Video disc is a read only disc. The DVD-Video disc is recorded with a copyright information for prohibiting copying contents of the DVD-Video disc by using a contents scramble system (hereinafter abbreviated as CSS) in a certain area, which is an information area related to copyright protection such as the CSS system. A system protecting illegal copying is employed such that an information related to the copyright protection such as the CSS system is read out by a DVD-Video disc reproducing apparatus, and then the reproducing apparatus reproduces contents of the DVD-Video disc by using the information related to the copyright protection.

In a case that a recordable optical disc, which is recorded with contents of a DVD-Video disc in conjunction with an information related to copyright protection by a recording apparatus for a high density disc, is reproduced by a DVD-Video disc reproducing apparatus, there existed a problem such that the information related to copyright protection can be read out and the contents of the DVD-Video disc being prohibited to copy can be reproduced. Accordingly, copyright protection of a DVD-Video disc, which is prohibited to copy, can not be fully protected.

SUMMARY OF THE INVENTION

Accordingly, in consideration of the above-mentioned problems of the prior art, an object of the present invention is to provide an information recording medium such as a DVD-RW disc, which can be recorded and reproduced, and a recording method and a reproducing method thereof.

In order to achieve the above object, the present invention provides, according to a first aspect thereof, an information recording medium comprising: an information track formed spirally or in coaxial circles; a recordable area for information being prerecorded with a frequency signal and an address signal from an inner circumference of the information track; and a read only area being recorded with a reproduction signal as a readable pit, wherein there existed a boundary between the recordable area and the read only area.

According to a second aspect of the present invention, there provided an information recording medium comprising: an information track formed spirally or in coaxial circles; a first read only area recorded with a frequency signal being recorded as a pit being able to read out a reproduction signal; and a second read only area recorded as a pit being unable to read out a reproduction signal and prerecorded with a frequency signal and an address signal, wherein there existed a boundary between the first read only area and the second read only area.

According to a third aspect of the present invention, there provided an information recording medium comprising: an information track formed spirally or in coaxial circles; a recordable area for information being prerecorded with a frequency signal and an address signal from an inner circumference of the information track; a first read only area recorded with a frequency signal being recorded as a pit being able to read out a reproduction signal; and a second read only area recorded as a pit being unable to read out a reproduction signal and prerecorded with a frequency signal and an address signal, wherein there existed a boundary between the recordable area and the first read only area and another boundary between the first read only area and the second read only area.

According to a fourth aspect of the present invention, there provided a recording method of the above-mentioned information recording medium, the recording method comprising steps of: identifying the information recording medium by reproducing an identification information out of information recorded on the information recording medium; judging the boundary being identified in the step of identifying by using an address information; and recording in a vicinity of the boundary for performing a recording process by altering a control method of tracking.

According to a fifth aspect of the present invention, there provided a reproducing method of the above-mentioned information recording medium, the reproducing method comprising steps of: identifying the information recording medium by reproducing an identification information out of information recorded on the information recording medium; judging the boundary being identified in the step of identifying by using an address information; and reproducing the boundary for performing a reproducing process by altering a control method of reproducing.

Other object and further features of the present invention will be apparent from the following detailed description when read in conjunction with the accompanying drawings.

BRIEF DESCRIPTION OF DRAWINGS

FIG. 1(a) is a partially enlarged cross sectional view of a resist board of an information recording medium according to a first embodiment of the present invention.

FIG. 1(b) is a partially enlarged plan view of the resist board shown in FIG. 1(a).

FIGS. 3(a) to 3(d) are exemplary drawings for explaining that an ECC blocked data is recorded sector by sector in a specific area of an information recording medium of the present invention.

FIG. 6(a) is a partially enlarged cross sectional view of a resist board of an information recording medium according to a second embodiment of the present invention.

FIG. 6(b) is a partially enlarged plan view of the resist board shown in FIG. 6(a).

FIG. 7(a) is a comparative example of a partially enlarged cross sectional view of a resist board of an information recording medium in a cutting state.

FIG. 7(b) is a partially enlarged plan view of the resist board shown in FIG. 7(a).

FIG. 8(a) is another comparative example of a partially enlarged cross sectional view of a resist board of an information recording medium in a cutting state.

FIG. 8(b) is a partially enlarged plan view of the resist board shown in FIG. 8(a).

FIG. 11(a) shows a configuration of a lead-in area and a data area of an information recording medium according to a fourth embodiment of the present invention.

FIG. 11(b) is a comparison table showing differences between a type 4 and a type 5 shown in FIG. 11(a).

FIG. 12(a) shows a configuration of a lead-in area and a data area of an information recording medium according to a fifth embodiment of the present invention.

FIGS. 12(b) through 12(d) are comparison tables showing differences between a type 6 and a type 7 shown in FIG. 12(a).

FIG. 14(a) shows a configuration of a lead-in area and a data area of an information recording medium according to the sixth embodiment of the present invention.

FIGS. 14(b) and 14(c) are comparison tables showing differences between a type 6 and a type 8 shown in FIG. 14(a).

DETAILED DESCRIPTION OF THE PREFERRED EMBODIMENTS

Figure 2A:
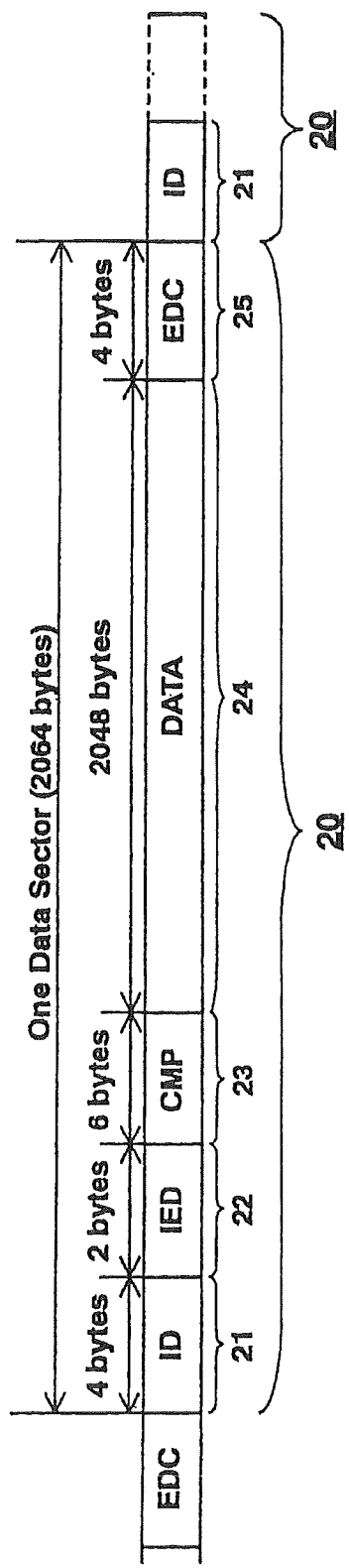
FIG. 2(a) shows configuration of a data sector, which constitutes a recording information to be recorded on an information recording medium of the present invention.

Prior to depict each embodiment of the present invention, configuration and recording method of a recordable disc such as a DVD-RW (Digital Versatile Disc for Re-recordable) is described first in general.

In a recordable disc such as a DVD-RW disc, an information related to a copyright protection information is recorded in a specific area (an information area for copyright) of the DVD-RW disc by an emboss pre-pit, wherein the specific area is usually recorded with a copyright protection information of a DVD video in a normal state and is treated so as not to be able to overwrite the recorded copyright protection information. By his method, in a case that a DVD video contents, which is not comply with the copyright protection information, is recorded on a DVD-RW disc by using a high density disc recording apparatus, and then the DVD video contents is reproduced by a DVD video reproducing apparatus, the copyright protection information corresponding to the contents can not be reproduced, so that the DVD video contents can not be reproduced. Accordingly, copyright of a DVD video, which is prohibited from copying, can be protected.

A recordable optical disc is prerecorded with various information such that a prerecorded information such as a condition of specifying luminous energy of a laser beam for recording, a disc type, and a name of manufacturer, or an address information for being able to find out a specific position of a recordable guide groove and further, a frequency information utilized for controlling a number of rotations of the disc are prerecorded in a specific position respectively.

Such a recordable optical disc is designed to be used immediately after the disc is purchased. As described in following paragraphs (1) through (3), it is caused by being recorded with the prerecorded information or the address information in a specific position as mentioned above.

The above-mentioned prerecorded information is recorded as an emboss pit when cutting a master disc. By forming a disc substrate by using a metal mother mold, which is produced by the master disc, the prerecorded information is recorded in a specific position of the disc substrate of the above-mentioned recordable optical disc such as a lead-in area of the disc. Further, in a case that the above-mentioned prerecorded information is not recorded while cutting a master disc, the information is additionally recorded in the above-mentioned specific position as a pit or a mark by using a recording device for recording the prerecorded information.

On the other hand, the above-mentioned address information is recorded as an LPP (Land Pre-Pit) in a specific position of a guide groove of which width is widened.

Further, the above-mentioned frequency information is recorded as a wobble frequency, which is a frequency of wobbling a guide groove microscopically in a radial direction.

Recording the above-mentioned prerecorded information, address information, frequency information, and a guide groove in a specific position of a disc substrate is actually performed as follows: coating photosensitive resist uniformly on a glass substrate, which is polished flat, in a thickness of corresponding to a depth of guide groove. In a case that a recordable optical disc is a DVD-RW disc, the photosensitive resist is coated uniformly on the glass substrate as thick as approximately 30 nm.

The glass substrate uniformly coated with photosensitive resist (hereinafter referred to resist board) is transferred to a cutting apparatus. The cutting apparatus is equipped with a laser beam control device, which makes a laser beam for cutting irradiated from a light source intermitted or wobbled microscopically right and left in a radial direction. By irradiating the laser beam for cutting, which is an intermittent light beam or wobbled microscopically in the radial direction, on the resist board, the above-mentioned prerecorded information and address information and frequency information are recorded in an specific position respectively after the resist board is mounted on a predetermined position in the cutting apparatus.

Two laser beams for cutting are utilized herein, one of them is utilized for forming a guide groove in a continuous light beam and the other is utilized for forming an LLP in an intermittent light beam. Further, the prerecorded information mentioned above is recorded as a pit in a predetermined position such as a lead-in area by intermitting the laser beam for cutting utilized for forming a guide groove.

The resist board is developed after cutting the resist board, and then a shape information, which is the aforementioned prerecorded information and address information and frequency information and guide groove, is deposited as shape change on the resist board. The developed resist board is covered with a conductive thin film. By using an electroplating method, the shape information on the resist board is transcribed on a plated board. The plated board is formed in predetermined dimensions and becomes a metal mother mold. By using an injection-molding machine installed with the metal mother mold, the shape information is transcribed on a plastic substrate as shape change. Accordingly, a disc substrate for a recordable optical disc is obtained.

The specific position on the disc substrate at where the shape change is transcribed is called an information surface. A functional film for recording is formed on the information surface and finally a recordable optical disc is manufactured through various after-processes. The disc substrate produced through an injection-molding process by using the metal mother mold mentioned above has guide grooves and pits in a same depth throughout the disc substrate.

As mentioned above, since a guide groove of a recordable optical disc is formed in a necessary depth for tracking guide while recording, when a signal from a recorded recording mark is maximally read out while reproducing, a problem such that reflectivity decreases due to a phase difference of reflected light caused by a depth difference between a land of a recording groove and the guide groove arises. In a case of the land groove recording method utilized for a repeatedly rewritable DVD-RAM (DVD-Random Access Memory) disc, a guide groove is formed as deep as possible so as to decrease an inter-track cross-talk between a land allocated between guide grooves and a groove or a guide groove. However, a depth of a guide groove is usually formed shallower than a depth from which a guide signal can most effectively be read out, that is, approximately one eighth of a reproduction wavelength of laser beam. Further, a tracking operation for a guide groove is performed by the push-pull method.

On the other hand, in a case of a read only disc such as a DVD-ROM (DVD-Read Only Memory) disc, a pit depth is designated to be a certain depth at where diffraction by a laser beam is effectively performed, that is, approximately one quarter of a reproduction wavelength of the laser beam so as to obtain a reproduction signal as large as possible. Therefore, a signal necessary for tracking can not be sufficiently obtained by the push-pull method applied to a pit array, so that a tracking operation is performed by the phase difference method.

As mentioned above, in a case of a DVD-RAM disc as a recordable optical disc, a depth of a guide groove is designated so as to perform recording and reproducing operation effectively. In a case of a DVD-ROM disc as a read only disc, a depth of a pit is designated so as to be convenient for reproducing.

Comparative Example

Following two methods (1) and (2) are considered to provide a guide groove and a pit of which depth is different from each other in one disc substrate of a recordable optical disc.

FIGS. 7(a) and 7(b) are a comparative example of a partially enlarged cross sectional view and a plan view of a resist board of an information recording medium of the present invention respectively in a cutting state.

FIGS. 8(a) and 8(b) are another comparative example of a partially enlarged cross sectional view and a plan view of a resist board of an information recording medium of the present invention respectively in a cutting state.

In FIGS. 7(a) and 8(a), reference signs "A" and "B" are a laser beam "A" for cutting utilized for forming a pit and a guide groove and a laser beam "B" for cutting utilized for forming a land pre-pit (LPP) respectively.

In FIGS. 7(b) and 8(b) and in a following explanation, a symbol "LPP" shows a land pre-pit, which is formed on a land.

A first cutting method is such that as shown in FIGS. 7(a) and 7(b), by changing an output of a laser beam for cutting (hereinafter referred to laser beam "A") utilized for forming pits P11 and P12 and guide grooves G11 and G12 while cutting a resist board 110, a depth convenient for reproducing a pit is formed by a certain output of the laser beam "A" and a shallower guide groove convenient for recording the guide groove is formed by another output of the laser beam "A". However, according to the first cutting method, a bottom of the shallower guide groove does not reach a top surface of a glass substrate 101 allocated under a resist layer, so that a bottom surface of the guide groove is determined by output distribution of the laser beam "A" not by the glass substrate 101. Therefore, a shape of a bottom of guide groove becomes a funnel shape not flat. Actual output distribution of the laser beam "A" is uneven as maximum at a center of the laser beam, so that uniformity of a bottom surface of a guide groove is hardly realized. Accordingly, a signal characteristic of recording and reproducing is severely deteriorated.

With respect to a second cutting method, as shown in FIGS. 8(a) and 8(b), both the laser beam "A" for forming pits P21 and P22 and guide grooves G21 and G22 and the laser beam "B" for forming a land pre-pit are utilized while cutting a resist board 120. By using the laser beam "A" in a constant output, the pits P21 and P22 and guide grooves G21 and G22 are formed in a same depth respectively, wherein each bottom of the pits P21 and P22 reaches the top surface of the glass substrate 101 allocated under a resist layer. Further, the second cutting method is such that a resist adjacent to both edges of a guide groove is exposed as high as desired by using the laser beam "B" and a relative depth among guide grooves are adjusted. By using the second cutting method, each bottom of the guide grooves G21 and G22 is the top surface of the glass substrate 101, so that a bottom shape of the guide grooves G21 and G22 becomes flat. Accordingly, a similar recording and reproducing characteristic to a current disc formed only with guide grooves can be obtained.

However, while reproducing a boundary at where a pit array changes over to a guide groove and vise versa, the second cutting method generates disorder such that a pit signal and a LPP signal at a position of changing from a pit array and another pit array over to a guide groove and vise versa is deficient, an amplitude difference between the pit signal and the land pre-pit signal occurs, a tracking signal amplitude varies by a method such as the push-pull method, and offset occurs because a height of a resist allocated between two pit arrays is different from that of another resist allocated between a pit array and a guide groove or between a guide groove and a pit array.

As mentioned above, in a case that a pit array having a depth of convenient for reproducing exists together with a guide groove having a depth of convenient for recording and reproducing in one recordable optical disc, it is desirable to design a guide groove of which bottom reaches a top surface of a glass substrate and becomes flat in order to fully ensure a recording and reproducing characteristic of the guide groove. Further, while reproducing a transitional area from a pit array to a guide groove and/or from a guide groove to a pit array, it is found that there is existed a recording apparatus, which is deficient in a pit signal and disordered in reproduction tracking by the push-pull method at the transitional area. This is caused by that the recording apparatus can not correctly read out a signal of pit array, which is affected by adjustment of resist thickness of an adjacent guide groove in a transitional area from a guide groove to a pit array. Therefore, the pit array and the guide groove are deficient in total signal information of adjacent pit arrays. In such a recording apparatus of being disordered in tracking, a tracking control signal shows an abnormal value at a transitional area from a pit array to a guide groove and/or from a guide groove to a pit array and tracking becomes out of order. Accordingly, a position of reproducing track skips more than some ten tracks and recording and reproducing of a desired position can not be performed.

Accordingly, in order to obtain a sufficient reproduction signal by recording in a guide groove and reproducing from the guide groove and in order to record an information disabled to rewrite in a pit array, it is necessary for a depth of a guide groove and a pit array to be an optimum depth respectively. Further, both bottoms of a guide groove and a pit array are allocated at a top surface of a glass substrate and are flat. A disc as one recordable optical disc is required, wherein a pit array and a guide groove of the disc are excellent in a recording and reproducing characteristic, further, the disc can comply with recording and reproducing even though a pit signal drops out at a transitional area from a pit to a guide groove, and wherein a tracking signal is not disturbed by any tracking method.

With returning back to common description to each embodiment, a data configuration and a format will be depicted.

According to an aspect of the present invention, there provided an information recording medium, which can stably reproduce a copyright protection information of a read only pit array and can record contents in accordance with the copyright protection information. Particularly, positions of bottoms of a guide groove and a pit array formed on a disc substrate are in a same flat surface and bottom shapes of them are flat. Further, there provided an intermediate area being composed of a pit array of which height changes between a height from a bottom surface to a sidewall of a guide groove and another height from the bottom surface to a sidewall of the pit array. By reproducing the intermediate area with a tracking method of either the differential push-pull system or the phase differential system, an excellent reproduction information can be obtained from a read only pit array and a record only guide groove respectively. Furthermore, an optimum tracking characteristic can always be obtained in an area not recorded as well as in a recorded area.

FIG. 2(a) shows configuration of a data sector, which constitutes a recording information to be recorded on an information recording medium of the present invention.

Figure 2B:
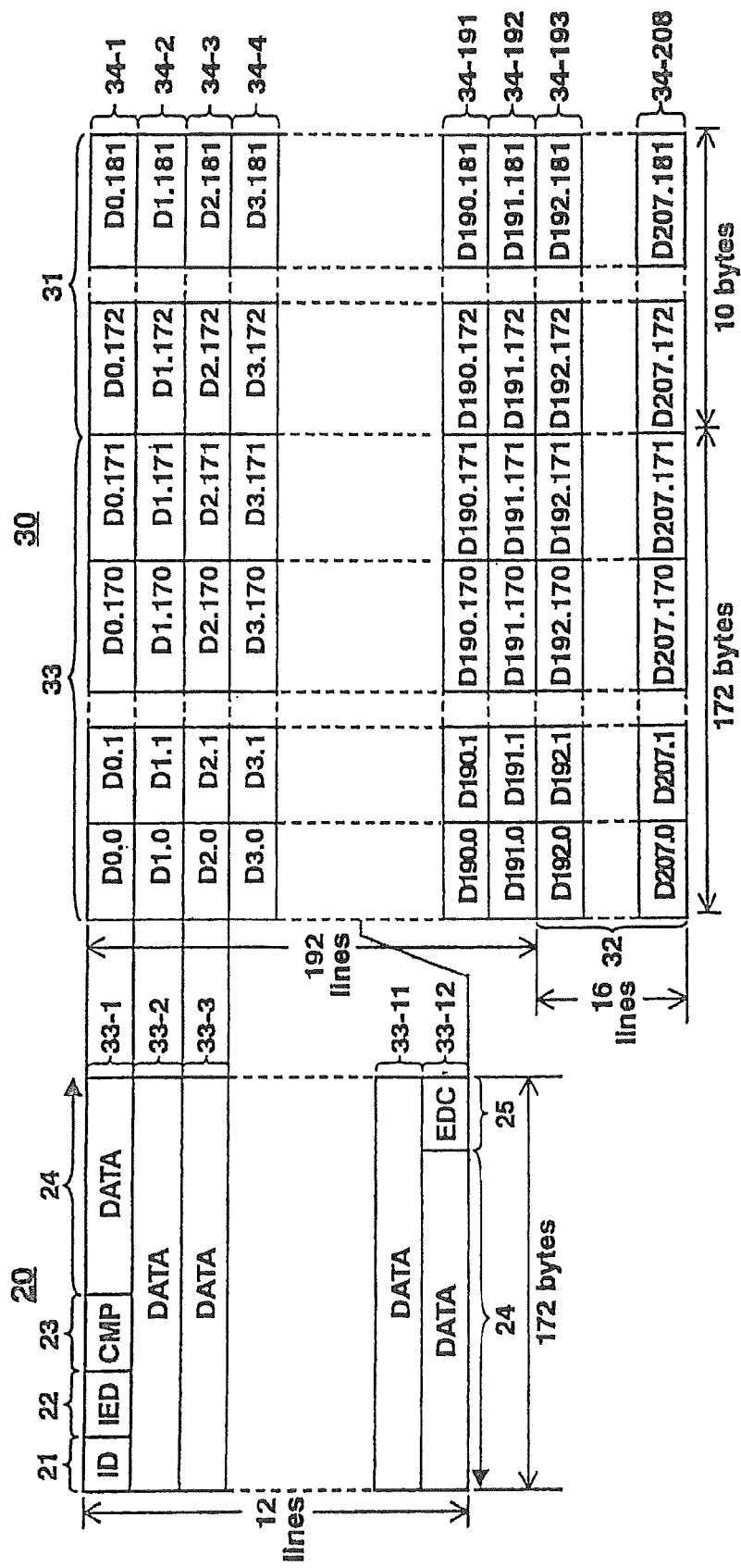
FIG. 2(b) shows an ECC block being composed of the data sector shown in FIG. 2(a)

FIG. 2(b) shows an ECC block being composed of the data sector shown in FIG. 2(a)

FIGS. 3(a) to 3(d) are exemplary drawings for explaining that an ECC blocked data is recorded sector by sector in a specific area of an information recording medium of the present invention.

Figure 4:
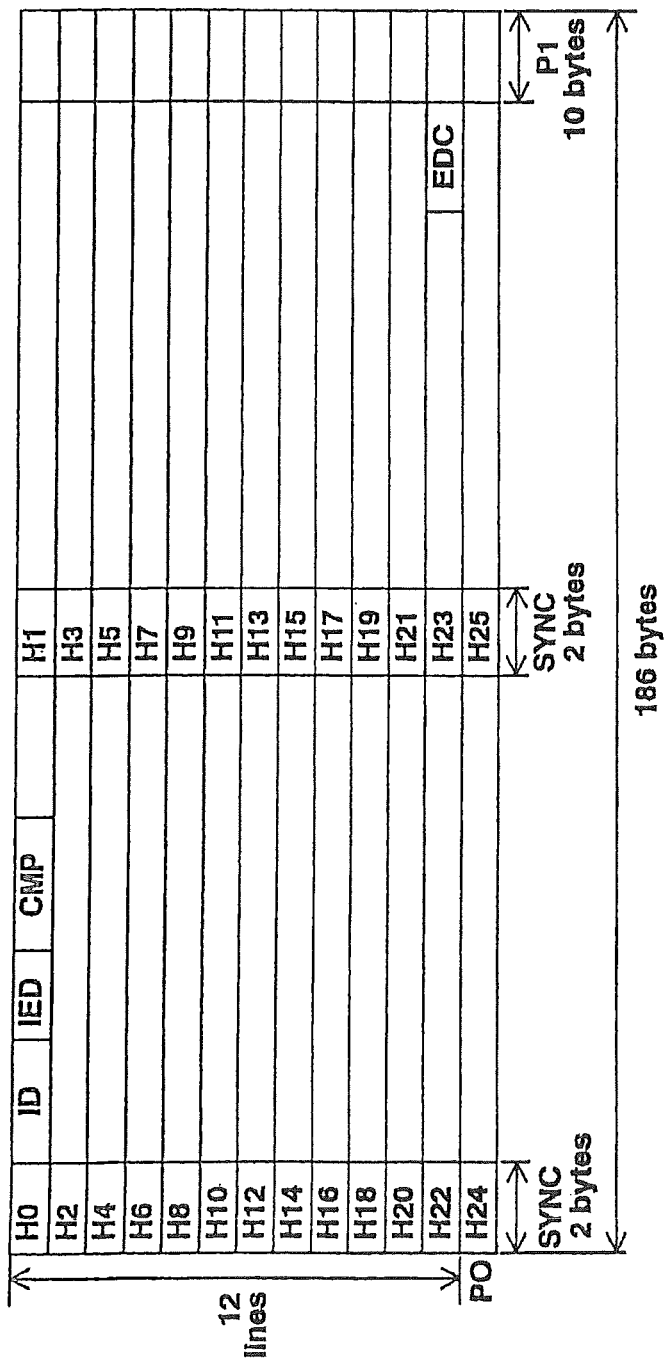
FIG. 4 shows a physical format of one sector in a DVD-RW (Digital Versatile Disc for Re-recordable) disc, which is one embodiment of an information recording medium according to the present invention.

FIG. 4 shows a physical format of one sector in a DVD-RW disc, which is one embodiment of an information recording medium according to the present invention.

By using a DVD-RW disc as an embodiment of an information recording medium of the present invention, recording an information on the DVD-RW disc is mainly explained in a following description. However, the present invention can apply to other recordable disc such as a CD-RW (Compact Disc-ReWritable) disc and a DVD+RW disc, and a high density optical disc such as a DVD disc in a next generation.

First of all, with referring to FIGS. 2(a) through 4, a physical format in general and an error correction process of a recording information or a lead-in information is depicted when the recording information is recorded on a DVD-RW disc.

With referring to FIGS. 2(a) and 2(b), an error correction code (ECC) block as an error correction unit in an error correction process of a DVD-RW disc of the present invention is explained.

Generally, a recording information to be recorded on a DVD-RW disc is constituted by a physical configuration being composed of a plurality of data sectors 20 shown in FIG. 2(a). 2064 bytes of one data sector 20 comprises 4 bytes of an ID information 21 indicating a start position of the data sector 20, 2 bytes of an ID information error correction code (IED) 22 for correcting an error of the ID information 21, 6 bytes of a spare data (such as CMP) 23, 2048 bytes of a data area 24 for storing a main data to be recorded, and 4 bytes of an error detection code (EDC) 25 for detecting an error in the data area 24 in order from a head of the data sector. A sequence of a plurality of data sectors 20 configures a recording information to be recorded.

With referring to FIG. 2(b), a process of configuring an ECC block by using the data sector 20 is depicted next. As shown in FIG. 2(b), one data sector 20 composed of 2064 bytes is divided into 12 blocks 33-1 through 33-12, which are composed of 172 bytes respectively. Each divided block (hereinafter generically referred to a data block 33) is allocated in a vertical direction, wherein 12 lines of the data block 33 are allocated in the vertical direction.

Adding a 10-byte ECC parity in (PI) code 31 to an end of each data block 33 configures one correction block 34. In this stage, 12 lines of correction block 34 added with the PI code 31 are allocated in the vertical direction. After that, the process is applied to 16 data sectors 20 repeatedly. Accordingly, 192 lines of correction blocks 34-1 through 34-192 are obtained.

While 192 correction blocks 34-1 through 34-192 (hereinafter generically referred to correction blocks 34) are drawn up in 192 lines vertically, the 192 correction blocks 34 are divided into one byte each from an each head of correction blocks 34 in the vertical direction. In other words, each line of correction blocks 34 is divided into 182 data horizontally. Then, 16 ECC parity out (PO) codes 32 are added to each data of divided correction blocks 34, wherein the PO code 32 is also added to data included in the PI code 31.

By the above-mentioned process, one ECC block 30 including 16 data sectors 20 each of which is composed of 12 lines of data blocks 33 is configured as shown in FIG. 2(b). In this case, a total amount of information included in one ECC block 30 is: (172+10) bytes×(192+16) lines=37856 bytes. Further, an actual amount of data, which are recorded in the data area 24 of one data sector 20, is: 2048 bytes×16=32768 bytes.

Furthermore, one byte of data is indicated as "D#.*" in the ECC block 30 shown in FIG. 2(b). The "D1.0", for example, indicates one byte of data, which is allocated in the first line and in the zeroth column. In a case of "D190.170", it is one byte of data allocated in the 190th line and in the 170th column. Moreover, the PI code 32 is allocated in the 172nd through 181st columns, and the PO code 32 is allocated in the 192nd through 207th lines.

In addition thereto, one correction block 34 is continuously recorded on a DVD-RW disc. As shown in FIG. 2(b), in order to correct a data drawn up in the horizontal direction by the PI code 31 and to correct a data drawn up in the vertical direction by the PO code 32, the ECC block 30 is configured to include both the PI code 31 and the PO code 32. In other words, in the ECC block 30 shown in FIG. 2(b), it is possible to correct error doubly in the horizontal direction and the vertical direction. Accordingly, a stronger error correction than the error correction process utilized for a conventional CD disc can be ensured.

An actual error correction is depicted next. In a case that one correction block 34, which is composed of a data of 182 bytes in total including one line of PI code 31 as mentioned above and is recorded on a DVD-RW disc continuously, is up to 5 bytes, for example, an error can be corrected even though a part of the data is destroyed by a scratch or a cut. However, in a case that one correction block 34 is more than 6 bytes and all the one line of data is destroyed by a scratch on a DVD-RW disc, the PI code 31 can not correct the data any more. Although all the one line of data is destroyed, it is only one byte of a destroyed data for one column of the PO code 32 with viewing from a vertical direction. Accordingly, by correcting an error by using each line of the PO code 32, the error can be properly corrected and a data can be accurately reproduced even though one correction block 34 is totally destroyed. However, a scratch must be minimized because the scratch may cause an error of a next horizontal line in a vertical direction if the scratch of a horizontal line is enlarged as far as considering an acquired scratch. In this connection, an error in a vertical direction can be corrected even though a data in 8 vertical columns is destroyed. Further, errors in 16 vertical columns can also be corrected by the eraser correction method.

With referring to FIGS. 3(a) through 3(d), they depict how the data sector 20, which is configured to be the ECC block 30 shown in FIG. 2(b), is actually recorded on a DVD-RW disc. In FIGS. 3(a) through 3(d), a data indicated as "D#.*" is corresponding to a data indicated in FIG. 2(b).

When recording the ECC block 30 on a DVD-RW disc, as shown in FIGS. 3(a) and 3(b), the ECC block 30 is divided into 16 recording sectors 40-1 through 40-16 (hereinafter generically referred to recording sector 40) by being drawn up per each correction block 34 in one line horizontally and by being interleaved. In this case, one recording sector 40 is composed of 2366 bytes (37856 bytes÷16) of information. In the recording sector 40, there existed the data sector 20, the PI code 31, and the PO code 32 mixed. However, the ID information 21 shown in FIG. 2(a) is allocated at a head of each recording sector 40.

One recording sector 40 is divided into 91 bytes each of a data 41, and a sync "H" is added to each data 41 as shown in FIG. 3(c). The recording sector 40 is modulated by the eight to sixteen (8/16) modulation method, and then the recording sector 40 is divided into 26 sync frames 42-1 through 42-26 (hereinafter generically referred to sync frame 42) and one sync frame 42 is formed per each data 41 as shown in FIG. 3(d). In other words, one recording sector is composed of 26 sync H' and 26 data 43-1 through 43-26 (hereinafter generically referred to data 43) and each sync frame 42 is composed of a sync H' and a data 43. Further, an information amount of one sync frame 42 is: 91 bytes×8×(16÷8)=1456 bytes. An information is recorded on a DVD-RW disc by a series of the sync frame 42.

With referring to FIG. 4, the above-mentioned configuration is summarized. A head sector of one ECC block 30 being composed of 16 sectors is configured as a physical format as shown in FIG. 4. In other words, one horizontal line is composed of 172 bytes of data, 10 bytes of the PI code 31, and 4 bytes of sync, and is configured 186 bytes in total. Further, the head sector is composed of 12 lines and one line of PO code 32, and configured 13 lines in total. The sync is composed of 2 bytes each of H0 through H25, that is, 26 in total.

By recording an information on a DVD-RW disc with configuring the physical format as mentioned above, an amount of data blocks being destroyed can be minimized by performing the 8/16 demodulation and de-interleave when reproducing the information, and the original ECC block 30 can be restored thereby. Accordingly, the information can most accurately be reproduced by performing a powerful error correction as mentioned above. An information relating to copyright protection such as a media key block, which is allocated in a lead-in information area, is recorded as a part of data of such the ECC block.

First Embodiment

According to a first embodiment of the present invention, there is provided a recordable optical disc as an information recording medium. The recordable optical disc is designed such that a groove depth of a guide groove and a pit depth of a pit array is different from each other by exposing resist of a guide groove, and that bottoms of a guide groove and a pit array are formed by a top surface of a glass substrate. Further, in a transitional area from a pit array to a guide groove or vise versa, an intermediate area, wherein a height of a guide groove is changed, is provided by changing an output of a laser beam for exposing resist. A tracking error signal in an allowable amplitude difference and a signal within a range of offset level can be obtained by the differential push-pull method and the differential phase detect (DPD) method in the intermediate area.

By the above-mentioned method, it is confirmed that a pit signal of a pit array adjacent to a guide groove in a transitional area from the pit array to the guide groove or vise versa is not severely affected by resist exposure for adjusting a resist thickness of the guide groove. Further, dropout or damage of a pit shape does not occur, so that a pit recording information can be accurately read out and a recording information can be accurately recorded in a recording area.

FIG. 1(a) is a partially enlarged cross sectional view of a resist board of an information recording medium according to a first embodiment of the present invention.

FIG. 1(b) is a partially enlarged plan view of the resist board shown in FIG. 1(a).

An information recording medium according to the first embodiment of the present invention is a recordable optical disc having a disc substrate formed with a resist board 100 shown in FIGS. 1(a) and 1(b). In FIG. 1(a), the recordable optical disc is composed of read only areas P1 and P2, a recording/reproducing area A1 formed with guide grooves 1a through 1c (hereinafter generically referred to guide groove "1") and an intermediate area, which is formed between the areas P1 and P2. Further, as shown in FIG. 1(b), other guide grooves 2a through 2d (hereinafter generically referred to guide groove "2") are allocated in the area P2. Furthermore, a guide groove "3" is allocated in the intermediate area.

As shown in FIGS. 1(a) and 1(b), all bottoms of pit arrays PAa through PAc (hereinafter generically referred to pit array PA) in the area P1, pit arrays PBa through PBd (hereinafter referred to pit array PB) in the area P2, and a pit array PM in the intermediate area are in a same flat level, wherein each bottom of pit arrays PA, PB, and PM is allocated on a top surface of a glass substrate 101.

A pit depth, that is, an optical pit depth of the pit array PM to a bottom of the pit array PM in the intermediate area is constituted so as to decrease, for example, from an optical depth "a" of a land L101 to an optical depth "b" of a land L102 as shown in FIGS. 1(a) and 1(b).

As mentioned above, in a recordable optical disc from which a reproduction signal can be obtained sufficiently by recording in and reproducing from a guide groove and further, on which a not rewritable information can be recorded by a pit array, a groove depth of guide groove and a pit depth of a pit array is necessary to be a most suitable depth respectively. Furthermore, both bottoms of a guide groove and a pit are positioned on a top surface of the glass substrate 101. Moreover, the recordable optical disc must be excellent in a recording and reproducing characteristic. In addition thereto, the recordable optical disc must be a disc such that a pit signal does not drop out or a tracking signal is not disturbed in a transitional area from a pit to a guide groove or vise versa.

Referring back to FIGS. 1(a) and 1(b), a master disc of a recordable optical disc according to the first embodiment is produced by a cutting device (not shown) in accordance with following processes.

Resist is coated over the glass substrate 101 of which surface is finely ground as thick as a most deep shape corresponding to a pit depth of a pit array. Two laser beams "A" and "B" are irradiated from a laser beam source (not shown). A light polarizing device (not shown) for shifting a laser beam to right and left slightly in a horizontal direction and a light modulator (not shown) for changing laser beam strength is provided in a light path of the laser beam "A".

As shown in FIG. 1(a), on the resist board 100, a guide groove "1" of which bottom is allocated on the top surface of the glass substrate 101 is recorded by the laser beam "A" in a laser beam strength PA1 suitable for recording a guide groove "1", wherein the bottom of the guide groove "1" is exposed as deep as the top surface of the glass substrate 101. The guide groove "1" is slightly wobbled by a predetermined frequency. On the other hand, the laser beam "B" records in a laser beam strength PB1 so as to remain a necessary thickness of resist for forming the guide groove "1". Because there is existed thicker resist than necessary thickness for forming a guide groove having a proper groove depth in a land, which is allocated between the guide grooves "1". Further, the light modulator (not shown) outputs certain laser beam strength necessary to form a land pre-pit (LPP) when recording the LPP.

As shown in FIG. 1(a), the other guide groove "2", which is provided in a pit area composed of the pit array PB in the area P2, is exposed by the laser beam "A" being suitable for recording such a guide groove "2" after the guide groove "1" in the area A1 is formed, wherein a bottom of the guide groove "2" is desired to be exposed as deep as the top surface of the glass substrate 101. However, the depth is not limited to the desired depth. A specific thickness of resist necessary for the pit array PB in the area P2 is formed on a land between the pit arrays PB by using the laser beam "B" in a laser beam strength PB3 so as to remain a resist thickness equivalent to that of the guide groove "1" in the area A1 and so as to increase a resist thickness gradually, Further, in the guide groove "1" adjacent to the pit array PB in the area P2, a certain thickness of resist equivalent to that of the pit array PB in the area P2 is formed by the laser beam "B" in a laser beam strength PB1. Furthermore, the laser beam "B" outputs a laser beam in certain strength necessary for forming a LPP when recording the LPP. In this case, the laser beam "B" can be slightly wobbled by a predetermined frequency.

Such an identification information for identifying a recordable optical disc is recorded in the area P1 having the pit array PA by using the laser beam "A" in a laser beam strength PA2 being suitable for recording a pit and for exposing all resist in a depth direction. Further, the area P1 is exposed as deep as the top surface of the glass substrate 101. In this case, the pit array PA is slightly wobbled by a predetermined frequency. However, in some cases, wobbling is not necessary.

As mentioned above, the recording/reproducing area (area A1), the read only area (areas P1 and P2), and the intermediate area is formed. Accordingly, the guide groove "1", pit arrays PA and PB, and the LPP is recorded on one resist board 100 as a latent image.

In a succeeding developing process, the latent image is deposited as a shape change and transferred to a metal master disc producing process. In the metal master disc producing process, the resist board 100 is covered with a conductive film such as nickel and formed with a nickel film thereon by nickel plating. A metal master disc formed with nickel is peeled off from the resist board 100. The peeled off metal master disc is cleaned and processed in predetermined dimensions so as to be installed on an injection mold. The metal master disc processed is called a mother die. The mother die is installed on the injection mold and a plastic disc substrate is formed by an injection molding method.

A functional film for recording or a recording layer is filmed on the disc substrate. A protective film, for example, is coated thereon or another substrate called a dummy substrate is stuck on the disc substrate. Accordingly, a recordable disc can be produced.

As shown in FIGS. 1(a) and 1(b), the intermediate area having the pit array PM is formed between the area P1 having the pit array PA and the area P2 having the pit array PB. An optical depth of the pit array PM in the intermediate area is a same optical depth as that of the area P1 or is shallower than that of the area P1 slightly. In some cases, an optical depth can not be regulated accurately.

A formatting method of a disc is depicted next.

Figure 5:
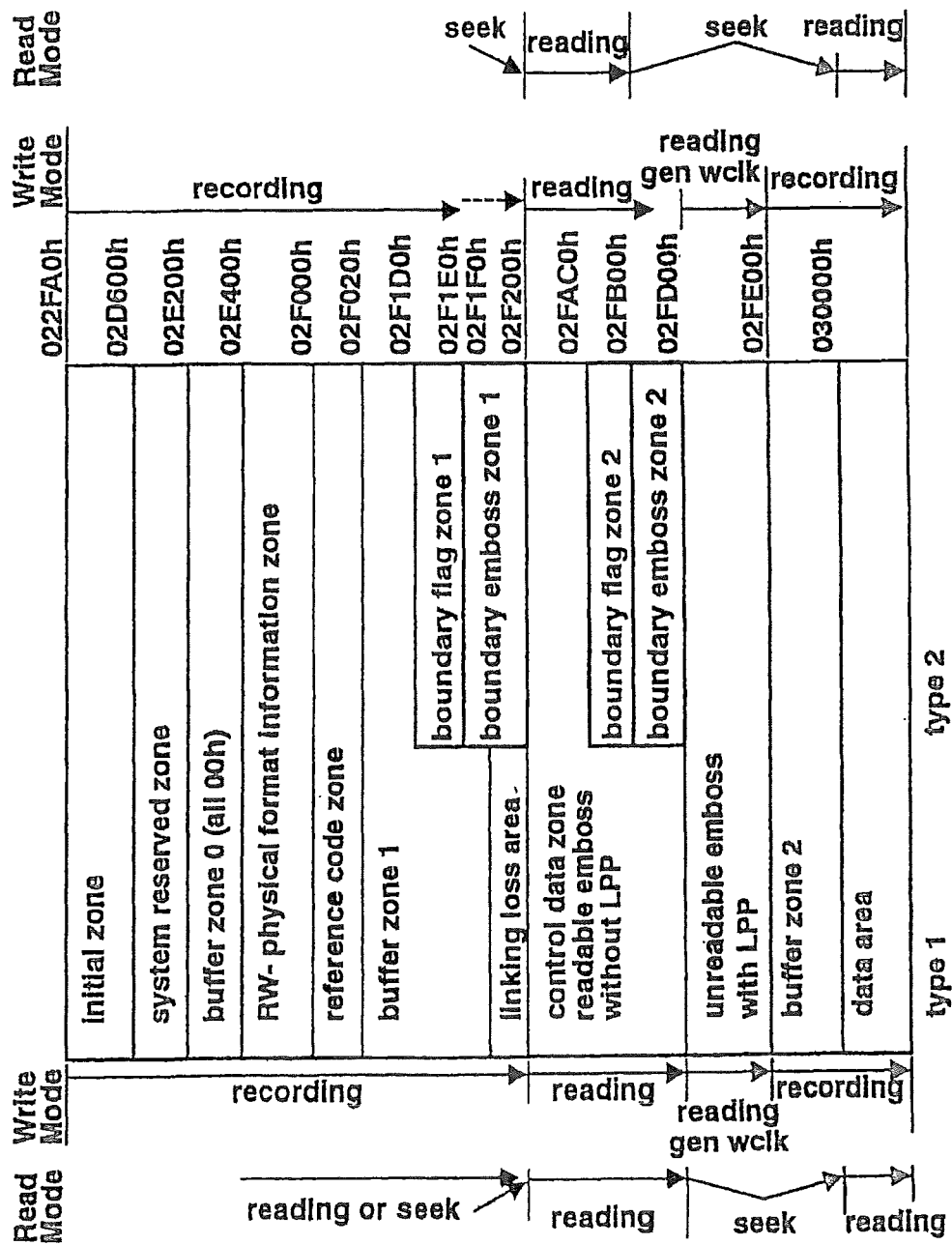
FIG. 5 shows a configuration of a lead-in area and a data area of an information recording medium of the present invention.

FIG. 5 shows configuration of a lead-in area and a data area of an information recording medium of the present invention.

In FIG. 5, a "type 1" represents a type of a disc such as shown in FIGS. 8(a) and 8(b), wherein an area changes continuously from a track of a read only pit area in a right side of the disc to a recordable groove area in a left side of the disc. On the other hand, a "type 2" represents another type of a disc such as shown in FIGS. 1(a) and 1(b), wherein there is existed an area having a pit as an intermediate area of which depth changes between a track provided in a read only pit area in a right side of the disc and a recordable groove area in a left side of the disc.

FIG. 5 exhibits a structure of a disc according to the present invention over a lead-in area allocated in an innermost circumference area through a data area allocated in an outer most circumference area. A manufacturing process varies in these areas as mentioned above. The structure is constituted as a format so as to be able to exist two types of discs, "type 1" and "type 2", together. The format is not so well in a signal performance or a recording and reproducing characteristic for a type 1 disc. However, the type 1 disc can rather easily be manufactured. On the other hand, with respect to a type 2 disc, the format is desirable for a signal performance or a recording and reproducing characteristic. Further, a manufacturing method can be more flexible by being existed two methods, which restrict a signal performance in an intermediate area, together.

A lead-in area of a type 1 disc is divided into four regions from an inner circumference area to an outer circumference area in order. The four regions are as follows:

A first region covering from an inner circumference area as an area of enabling to record and reproduce over to another area of enabling to record and reproduce having a LPP, which includes an information such as an address in a land area allocated side of a wobbled groove area having a depth of approximately $\lambda/12$ in an outer circumference direction, and an tracking error signal of the differential push-pull method can be obtained therein, such as an "initial zone", a "system reserved zone", a "buffer zone 0 (zero)" being composed of totally "00h", a "RW-physical format information zone", a "reference code zone", a "buffer zone 1", and a "linking loss area".

A second region is a "control data zone" or a "readable emboss zone without LPP" area, which is a read only area of enabling to read out a recording signal and enabling to obtain a DPD (differential phase detect) tracking error signal composed of a pre-pit without a LPP, and further, includes an information related to copyright protection and a lead-in information, wherein the region is constituted by a depth of approximately $\lambda/4$ and wobbled.

A third region is an "unreadable emboss zone with LPP" area, which is a read only area of being not able to read out a recording/reproducing signal although being able to obtain a DPD tracking error signal composed of a pre-pit with a LPP, wherein the zone is constituted by a depth of approximately $\lambda/12$ and wobbled.

A fourth region is composed of a "buffer zone 2", which is an area of enabling to record and reproduce having a LPP including an information such as an address in a land area allocated side of a groove area in an outer circumference direction with wobbled, wherein an tracking error signal of the differential push-pull method can be obtained, and a "data area" for recording user's contents succeeding thereafter.

In FIG. 5, an alphanumeric letters indicated at the right upper corner of each zone is a start address of each zone. An operation of a type 1 disc while recording is shown as "Write Mode" and an operation while reproducing is shown as "Read Mode" in the left side of FIG. 5 respectively. Wordings such as "recording", "reading", and "seek" represent a recording operation, a reproducing operation, and a seeking operation or a skipping a track operation respectively. Further, a wording "read gen wclk" represents an operation of producing a recording clock signal and a recording timing signal by reproducing a wobble signal and a LPP address signal.

A lead-in area of a type 2 disc is divided into six regions from an inner circumference area to an outer circumference area in order. The six regions are as follows:

(2-1) A first region covering from an inner circumference area as an area of enabling to record and reproduce over to another area of enabling to record and reproduce having a LPP, which includes an information such as an address in a land area allocated side of a wobbled groove area having a depth of approximately $\lambda/12$ in an outer circumference direction, and an tracking error signal by the differential push-pull method can be obtained therein, such as the "initial zone", the "system reserved zone", the "buffer zone 0 (zero)" being composed of totally "00h", the "RW-physical format information zone", and the "reference code zone".

(2-2) A second region is composed of a "boundary flag zone 1", which is an arbitrary zone to be provided, recorded with a code of judging a disc whether the disc is a type 1 or a type 2 and a "boundary emboss zone 1" as the aforementioned intermediate area, wherein the "boundary emboss zone 1" is a pit area formed with a depth from $\lambda/12$ to $\lambda/4$ approximately and wobbled. Further a tracking error signal by the differential push-pull method and a DPD tracking error signal can be obtained therefrom, wherein a "boundary flag 1" is written in a LPP or the "control data zone".

(2-3) A third region is the "control data zone" or the "readable emboss zone without LPP" area, which is a read only area of enabling to read out a recording signal and enabling to obtain a DPD tracking error signal composed of a pre-pit without a LPP, and further, includes an information related to copyright protection and a lead-in information, wherein the region is constituted by a depth of approximately $\lambda/4$ and wobbled.

(2-4) A fourth region is composed of a "boundary flag zone 2", which is an arbitrary zone to be provided, recorded with a code of judging a disc whether the disc is a type 1 or a type 2 and a "boundary emboss zone 2" constituted in reverse to the aforementioned intermediate area, wherein the "boundary emboss zone 2" is a pit area formed with a depth from $\lambda/4$ to $\lambda/12$ approximately and recorded with wobbling and a LPP. Further, a tracking error signal by the differential push-pull method and a DPD tracking error signal can be obtained therefrom, wherein the LPP is arbitrarily to be recorded, and wherein a "boundary flag 2" is written in the "control data zone".

(2-5) A fifth region is the "unreadable emboss zone with LPP" area, which is a read only area of being not able to read out a recording/reproducing signal although being able to obtain a DPD tracking error signal composed of a pre-pit with a LPP, wherein the zone is constituted by a depth of approximately $\lambda/12$ and wobbled.

(2-6) A sixth region is composed of the "buffer zone 2", which is an area of enabling to record and reproduce having a LPP including an information such as an address in a land area allocated side of a groove area in an outer circumference direction with wobbled and a depth of approximately $\lambda/12$, wherein an tracking error signal by the push-pull method can be obtained, and the "data area" for recording user's contents.

In FIG. 5, an alphanumeric letters indicated at the right upper corner of each zone is a start address of each zone. An operation of a type 2 disc while recording is shown as "Write Mode" and an operation while reproducing is shown as "Read Mode" in the right side of FIG. 5 respectively. Wordings such as "recording", "reading", and "seek" represent a recording operation, a reproducing operation, and a seeking operation or a skipping a track operation respectively. Further, a wording "read gen wclk" represents an operation of producing a recording clock signal and a recording timing signal by reproducing a wobble signal and a LPP address signal.

Both the "boundary flag zone 1" and the "boundary flag zone 2" are not necessary to be allocated in the specific regions as shown in FIG. 5. However, they must be prerecorded with embedding in the "control data zone" having a lead-in information in conjunction with an address information of a LPP in a recordable area so as to change a method of recording/reproducing in accordance with a type of disc, type 1 or type 2, and so as to be able to judge whether a disc to be recorded and reproduced is the type 1 or type 2.

Figure 9A:
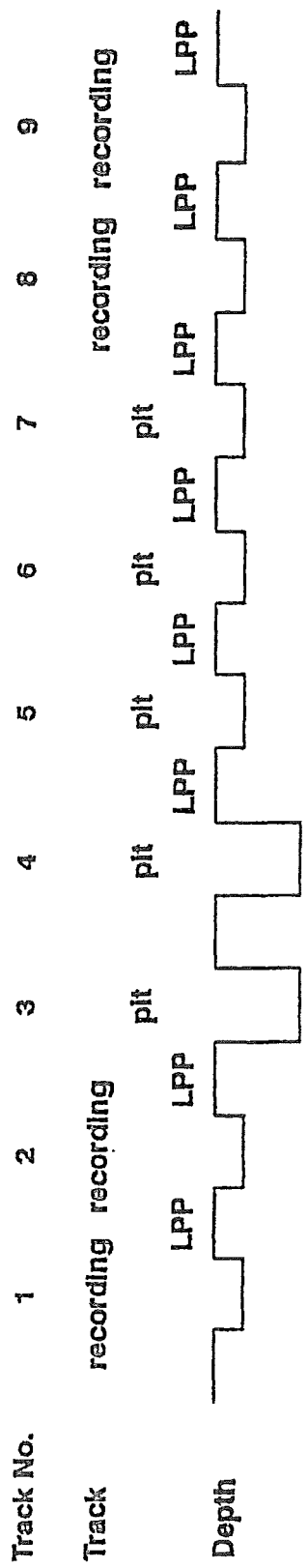
FIG. 9(a) is a track configuration of a type one disc showing allocation of recording and reproducing operation according to the present invention.

FIG. 9(a) is a track configuration of a type 1 disc showing allocation of recording and reproducing operation according to the present invention.

Figure 9B:
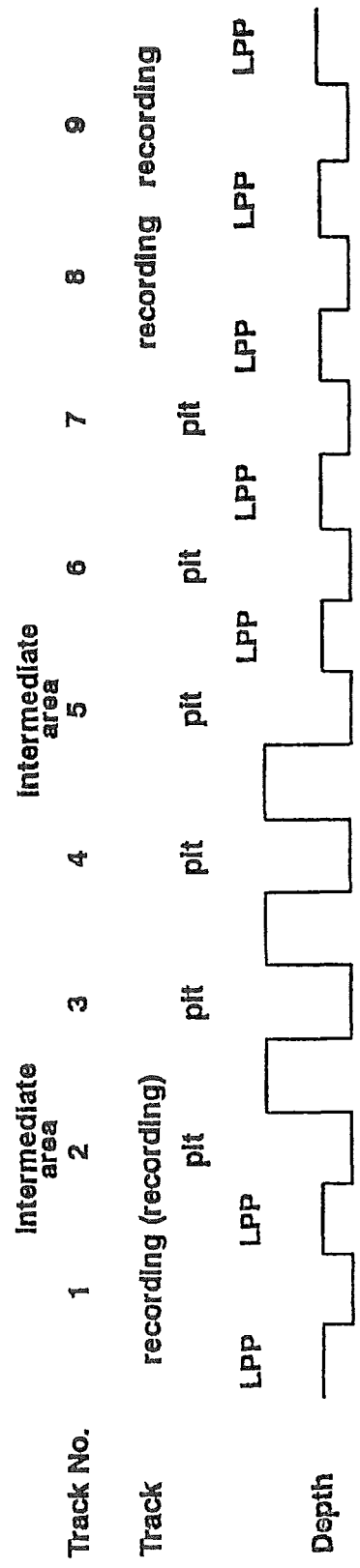
FIG. 9(b) is a track configuration of a type two disc showing allocation of recording and reproducing operation according to the present invention.

FIG. 9(b) is a track configuration of a type 2 disc showing allocation of recording and reproducing operation according to the present invention.

In FIGS. 9(a) and 9(b), track numbers 1 through 9 follow a track arrangement from an inner circumferential track to an outer circumferential track in order. A wording "recording" in a "Track" line under the track number indicates that a track No. 1 is a recording track, for example. A wording "pit" in a third line indicates that there existed a pit in a track. A wording "LPP" in a fourth line indicates that there existed an LPP on a land. A "Depth" is a cross sectional view of respective tracks showing relative depth of respective tracks. In FIG. 9(a), each track of track numbers 1 and 2 of a type 1 disc is an area of enabling to record and reproduce having a LPP, which possesses an information such as an address in a land area allocated to a side of a groove area having a depth of approximately $\lambda/12$ in an outer circumferential direction. The track numbers 1 and 2 are equivalent to the "initial zone", the "system reserved zone", the "buffer zone 0", the "RW-physical format information zone", the "reference code zone", the "buffer zone 1", and the "linking loss area" shown in FIG. 5, wherein a tracking error signal by the differential push-pull method can be obtained from these zones and area. A wobbling signal is allocated to all the areas shown in FIGS. 5 and 9(a).

Each track of track numbers 3 and 4 of the type 1 disc is configured by a depth of approximately $\lambda/4$ and is the "control data zone" or the "readable emboss without LPP" area, which is the read only area of enabling to read out a recorded signal, wherein a DPD tracking error signal composed of a pre-pit without a LPP can be obtained.

Each track of track numbers 5, 6, and 7 of the type 1 disc is configured by a depth of approximately $\lambda/12$ and is the "unreadable emboss with LPP" area, which is the read only area of disabling to read out a recorded signal, wherein a DPD tracking error signal composed of a pre-pit with a LPP can be obtained.

Each track of track numbers 8 and 9 of the type 1 disc is the "data area", which is an area of enabling to record and reproduce, wherein a tracking error signal by the differential push-pull method having a LPP, which possesses an information such as an address in a land area allocated to a side of a groove area in an outer circumferential direction.

In FIG. 9(b), a track of track number 1 of a type 2 disc is an area of enabling to record and reproduce having a LPP, which possesses an information such as an address in a land area allocated to a side of a groove area having a depth of approximately $\lambda/12$ in an outer circumferential direction. The track number 1 is equivalent to the "initial zone", the "system reserved zone", the "buffer zone 0", the "RW-physical format information zone", and the "reference code zone" shown in FIG. 5, wherein a tracking error signal by the differential push-pull method can be obtained from these zones.

A track of track number 2 of the type 2 disc is an intermediate area.

Each track of track numbers 3 and 4 of the type 2 disc is configured by a depth of approximately $\lambda/4$ and is the "control data zone" or the "readable emboss without LPP" area, which is the read only area of enabling to read out a recorded signal, wherein a DPD tracking error signal composed of a pre-pit without a LPP can be obtained.

A track of track number 5 of the type 2 disc is another intermediate area.

Each track of track numbers 6 and 7 of the type 2 disc is configured by a depth of approximately $\lambda/12$ and is the "unreadable emboss with LPP" area, which is the read only area of disabling to read out a recorded signal, wherein a DPD tracking error signal composed of a pre-pit with a LPP can be obtained.

Each track of track numbers 8 and 9 of the type 2 disc is the "data area", which is an area of enabling to record and reproduce, wherein a tracking error signal by the differential push-pull method having a LPP, which possesses an information such as an address in a land area allocated to a side of a groove area in an outer circumferential direction.

In the above-mentioned allocations, it is necessary for a disc to be judged whether the disc is the type 1 or the type 2 when recording or reproducing. With respect to a detecting method of the type 1 or the type 2, when a disc is loaded and processed to start, the disc is judged whether a value of the type 1 or the type 2 is recorded in the "control data zone" of the disc having the above-mentioned lead-in information by reproducing the "control data zone". Then the disc is judged by the value. The value can be read out by either a recording apparatus or a reproducing apparatus as the same detecting method as mentioned above. Further, the value of type 1 or type 2 is recorded as a LPP in the "boundary flag zone 1" and the "boundary flag zone 2", so that the disc can be judged by reading out the value when recording. This method can be applied for a recording by a recording apparatus. This type of recording can be performed by any other method if the value can be detected from a disc not recorded.

In a case that a disc of type 1 is recorded in tracks in an order of a track number form the track number 1, that is, in the order of the "Write Mode" indicated in the left side of FIG. 5, each track of track numbers 1, 2, 8, and 9 is a track to be recorded. As mentioned above, there existed a wobbling frequency signal on both sides of each track in all areas. By detecting the frequency signal, and by feeding back a velocity signal for rotating the disc, the disc is controlled by a constant linear velocity and a recording clock signal is produced. Succeedingly, a LPP recorded in a land is detected and an address signal is produced. A recording starts at a predetermined linking timing of the track in accordance with the produced address signal. In other words, a recording of the "initial zone" through the "linking loss area" in accordance with the "Write Mode" shown in the left side of FIG. 5 starts. Further, the recording is interrupted at a linking timing of an address corresponding to the track number 3 and the "Write Mode" is in a reading mode.

The track of the track number 3 is composed of a pit of enabling to reproduce a recording area without a LPP signal. An address is detected from the pit of enabling to reproduce and the "control data zone" or the "readable emboss without LPP" area is reproduced as far as the track number 4.

Each track of track numbers 5 through 7 is a track, wherein a signal of a pit can not be reproduced. However, since a wobble signal and a LPP signal is existed in the area, the wobble signal and the LPP address is reproduced while reproducing the track, and then a recording clock and recording timing signals are produced. This is corresponding to reproducing the "unreadable emboss with LPP" area in accordance with the "reading gen wclk" mode of the "Write Mode" shown in the left side of FIG. 5. In tracks of the track number 8 and above, a recording starts at a linking timing as same as the preceding track and performs a recording process thereafter. This is corresponding to recording the "buffer zone 2" and the "data area" in accordance with the "recording" mode of the "Write Mode" shown in the left side of FIG. 5.

On the other hand, in a disc of type 1, both side of each track is symmetrical with respect to a center axis of the track. Tracking error signals by the differential push-pull at a boundary of each track of the track numbers 2 and 3, each track of the track numbers 4 and 5, and each track of the track numbers 7 and 8 can be continuously obtained within some extent of amplitude difference.

As mentioned above, since a boundary of pit area can be continuously recorded, an RF signal can continuously be obtained while reproducing. Further, a process while reproducing shown as the "Read Mode" in the left side of FIG. 5 is performed by obtaining a tracking error signal by the DPD method, in some cases, the differential push-pull method can also be acceptable, and tracks of the track number 1 through the track number 9 are reproduced in order. In other words, zones including the "initial zone" through the "control data zone" are reproduced as shown by the "reading" of the "Read Mode" in the left side of FIG. 5. During this process, a signal of each track of the track numbers 5, 6, and 7 can not be reproduced, so that these tracks are skipped. This is corresponding to the "seek" mode of the "unreadable emboss with LPP" area and the "buffer zone 2" in the "Read Mode" shown in the left side of FIG. 5. Tracks of the track number 8 and above are continuously reproduced thereafter, that is, the "data area" is reproduced in response to the "reading" mode in the "Read Mode" shown in the left side of FIG. 5.

When recording a disc of type 2 in tracks of track number 1 and above in order, each track of track numbers 1, 8, and 9 is a track to be recorded. In a disc of type 1, a track of track number 2 is a recordable track. However, in a disc of type 2, a track of track number 2 is an intermediate area or a track having a pit. It is caused by that depths of lands allocated both sides of the track are different from each other in a track of track number 2 of a disc of type 2. Therefore, a signal can not be obtained by signal amplitude and an offset level of the signal equivalent to those of a preceding track, although a wobble and LPP signals necessary for recording are recorded. Further, a recording clock signal and a timing signal may not be accurately obtained.

A track of track number 5 is also an intermediate area as same as the track number 2. In a track of track number 5 of a disc of type 2, depths of lands allocated both sides of the track are different from each other. Therefore, a signal can not be obtained by signal amplitude and an offset level of the signal equivalent to those of a preceding track, although a wobble and LPP signals necessary for recording are recorded. Further, a recording clock signal and a timing signal may not be accurately obtained. Accordingly, obtaining the recording clock signal and the timing signal can be performed at a track of track number 6 and above A sequence of recording process shown in the "Write Mode" in the right side of FIG. 5 is depicted next. In a track of track number 1, there existed a wobbling frequency signal on both sides of a track as mentioned above. By detecting the frequency signal, and by feeding back a velocity signal for rotating the disc, a recording clock signal is produced in conjunction with controlling the disc in a constant linear velocity. Succeedingly, a LPP recorded in a land is detected and an address signal is produced. At a predetermined linking timing of the track in accordance with the produced address signal as a timing signal, a "recording" mode of recording the "initial zone" through the "boundary flag zone 1" in the "Write Mode" shown in the right side of FIG. 5 starts.

The "recording" mode is interrupted and changed into a reproducing mode at a linking timing of an address corresponding to the track of track number 2. Since a recording area of the track of track number 2 is composed of a pit of disabling or enabling to reproduce, reading the track is skipped over. This process is skipping the "boundary emboss zone 1" shown by an arrow with a broken line succeeding the "recording" mode of the "Write Mode" in the right side of FIG. 5. A recording area of a track of track number 3 is composed of a pit of enabling to reproduce without a LPP signal. An address is detected from a pit of enabling to reproduce and tracks up to the track number 4 are reproduced in accordance with the address. This process is reproducing the "control data zone" or the "readable emboss without LPP" area and the "boundary flag zone 2" in the "reading" mode of the "Write Mode" shown in the right side of FIG. 5.

In a track of track number 5, a signal of pit may not be reproduced or a LPP signal may not be accurately reproduced, so that reproducing the track is skipped over. Each track of track numbers 5 through 7 is a track, wherein a signal of a pit can not be reproduced. However, since a wobble signal and a LPP signal is existed in the area, the wobble signal and the LPP address is reproduced while reproducing the track, and then a recording clock and recording timing signals are produced. This process is corresponding to reproducing the "unreadable emboss with LPP" area in the "reading gen wclk" mode of the "Write Mode" shown in the right side of FIG. 5. In tracks of the track number 8 and above, a recording mode starts at a linking timing as same manner as the preceding track and a recording process is performed thereafter. This process is corresponding to recording the "buffer zone 2" and the "data area" in the "recording" mode of the "Write Mode" shown in the right side of FIG. 5.

In a disc of type 2, tracks of track numbers 2 and 5, which are intermediate areas at both sides of the track, are asymmetrical with respect to a center axis. At a boundary of the track, a tracking error signal by the differential push-pull system can be continuously obtained within some extent of amplitude difference although the tracking error signal can not be accurately recorded or reproduced due to the amplitude difference or generating offset.

Boundaries of pit areas can be continuously recorded if the areas are allocated as mentioned above, so that an RF signal can be continuously obtained while reproducing. A reproducing process, which is shown in the "Read Mode" in the right side of FIG. 5, is performed by reproducing tracks of track numbers 1 through 9 in order for obtaining a tracking error signal by either the DPD method or the differential push-pull method. In a disc of type 2, since a signal of each track of track numbers 2, 5, 6, and 7 can not be reproduced, reproducing the tracks is skipped over. The process is a seek mode of seeking the "initial zone" through the "boundary emboss zone 1" and the "boundary flag zone 2" through the "buffer zone 2" as shown by the "seek" of the "Read Mode" in the right side of FIG. 5. Each track of track numbers 3, 4, 8, and above is continuously reproduced thereafter. This process is a reproducing mode of reproducing the "control data zone" or the "readable emboss without LPP" area through the "boundary flag zone 2" and the "data area" as shown by the "reading" of the "Read Mode" in the right side of FIG. 5

In a case that a type of a disc can not be detected and is decided as the type 1, or in a case that a disc of type 2 is accidentally detected as the type 1, the present invention is effective for these kind of incorrect detection. In other words, in these cases, a recording apparatus tries to perform a recording process on the track of track number 2. However, by the track number 2, an LPP signal can not accurately be detected although a wobble signal is detected, so that either the recording process is interrupted or the recording process is performed with interpolating the LPP signal by a signal processing circuit. If the track of track number 2 is recorded totally, since a tracking error signal can be obtained from the area while reproducing the track, the area can be continuously reproduced without any problem although a reproduction signal can not be read out from the track of track number 2. Further, an LPP signal may not be read out from a track of track number 5. However, an LPP signal can be read out from a succeeding track, so that a recording and reproducing process can be continuously performed without any problem.

Second Embodiment

FIG. 6(a) is a partially enlarged cross sectional view of a resist board of an information recording medium according to a second embodiment of the present invention.

FIG. 6(b) is a partially enlarged plan view of the resist board shown in FIG. 6(a).

An information recording medium of the second embodiment is very similar to that of the first embodiment. Therefore, differences from the first embodiment are explained hereto. An information recording medium according to the second embodiment of the present invention is a recordable optical disc having a disc substrate formed with a resist board 200 shown in FIGS. 6(a) and 6(b). In FIG. 6(a), the recordable optical disc is composed of a read only area P201, a recording/reproducing area A201 formed with a guide groove "1" and an intermediate area, which is formed between the areas P201 and A201.

As shown in FIGS. 6(a) and 6(b), bottoms of pit arrays PAa through PAc (hereinafter generically referred to pit array PA) in the area P201 and a pit array PM in the intermediate area are in a same flat level, wherein each bottom of pit arrays faces toward a glass substrate 101.

A pit depth, that is, an optical pit depth of the pit array PM to a bottom of the pit array PM in the intermediate area is constituted so as to decrease, for example, from an optical depth "c" of a land L201 to an optical depth "d" of a land L202 as shown in FIGS. 6(a) and 6(b).

Third Embodiment

Figure 10:
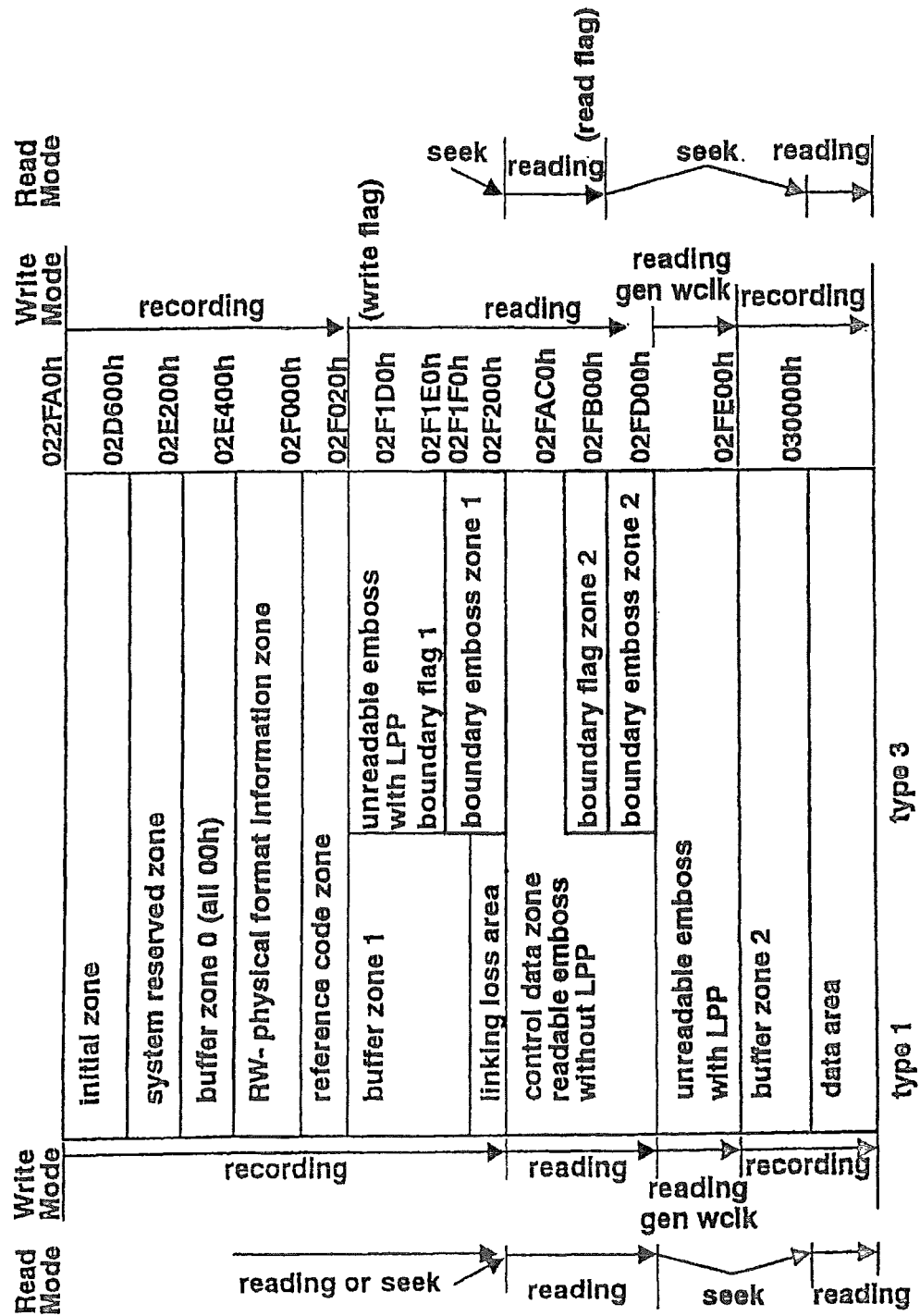
FIG. 10 shows a configuration of a lead-in area and a data area of an information recording medium according to a third embodiment of the present invention.

FIG. 10 shows a configuration of a lead-in area and a data area of an information recording medium according to a third embodiment of the present invention.

A major difference between FIG. 5 and FIG. 10 is such that the "buffer zone 1" of the type 2 shown in FIG. 5 is referred to an "unreadable emboss with LPP boundary flag 1" area in FIG. 10. In this case, a wobble signal is recorded in all areas and the wobble signal can be obtained from all the areas. This type of disc is defined as a type 3. With respect to recording and reproducing operations of a type 3 disc, the operations of recording and reproducing are shown by a "Write Mode" and a "Read Mode" respectively in the right side of FIG. 10. These operations of the type 3 is a same as those of the type 2 except for the "unreadable emboss with LPP boundary flag 1" area. Therefore, the same operation as that of the type 2 is omitted from a description of the type 3. A different operation from the type 2 is as follows.

An area of the "unreadable emboss with LPP boundary flag 1" is a same as the area of the "unreadable emboss with LPP". The "boundary flag 1" is written in an LPP of the area of "unreadable emboss with LPP boundary flag 1" or in a "control data zone". In FIG. 10, since the "boundary flag 1" is recorded in the "unreadable emboss" area instead of recording in the "buffer zone 1" basically, a recording process finishes at a "reference code zone" preceding the "unreadable emboss with LPP" area and is changed over to a reproducing operation. Further, a "boundary flag 2" is written in the "control data zone", In addition thereto, recording and reproducing operations of type 1 in FIG. 10 are a same as those of the type 1 in FIG. 5, so that a description of the type 1 is omitted.

Fourth Embodiment

FIG. 11(a) shows a configuration of a lead-in area and a data area of an information recording medium according to a fourth embodiment of the present invention.

FIG. 11(b) is a comparison table showing differences between a type 4 and a type 5 shown in FIG. 11(a), wherein wording "WBL" represents "wobbling". In this configuration, a wobble signal is recorded in all areas and the wobble signal can be obtained from all the areas. In FIG. 11(a), the type 4 and the type 5 is provided with both the "boundary emboss zone 1" and the "boundary emboss zone 2" of the type 2 shown in FIG. 5, which are allocated at the same addresses common to the type 1 and the type 2 shown in FIG. 5. As mentioned above, the "boundary emboss zone 1" and the "boundary emboss zone 2" is an area composed of an emboss pit shown in a comparison table in FIG. 11(b). In the type 4, wobble and LPP signals are recorded. On the other hand, in the type 5, a wobble signal is recorded. However, it is not required for the type 5 to be recorded with an LPP. Further, an LPP signal can not be accurately read out from the area of the "boundary emboss zone 1" and the "boundary emboss zone 2" although the LPP signal is recorded in the area. Furthermore, it is not necessary for an emboss pit in the area whether or not the emboss pit can reproduce a data. An identification information for indicating the type 4 or type 5 is prerecorded in an LPP signal or in a readable read only area such as the "control data zone".

By formatting as mentioned above, recording and reproducing operations shown by the "Write Mode" and the "Read Mode" in the left side of FIG. 11(a) are as follows: the "Write Mode" starts with recording a "initial zone" through a "liking loss area", the "Write Mode" is changed into a "reading" mode and a wobble signal is read out from an "unreadable emboss with LPP" area, a clock signal for recording is produced, an address signal is produced from the LPP and a timing for recording is produced in a "reading gen wclk" mode, and then another reading mode starts from a "buffer zone 2". In addition thereto, the "Read Mode" is the same as that of the second embodiment. Accordingly, a description of the "Read Mode" is omitted.

As mentioned above, exactly the same recording and reproducing method can be applied to a disc of either the type 4 or type 5, so that designing a device or an apparatus can be easier. In a case of the type 4, as mentioned above, a tracking signal can be obtained by either the push-pull or the differential push-pull method without any problem. On the other hand, in a case of the type 5, a tracking signal can be obtained by the differential push-pull method. However, by the push-pull method, it is hard to pass through the "boundary emboss zone 1" and the "boundary emboss zone 2" continuously. By prerecording an identification information for identifying the type 4 or type 5 such as a "type 4 flag" and a "type 5 flag" in a LPP or in a read only area such as a readable "control data zone", an appropriate method can be applied to a respective disc of type 4 or type 5.

Types of discs explained in each embodiment are classified hereto. Since the type 1 and the type 4 belongs to a same group, the type 1 represents generically the group hereinafter. Further, the type 2, type 3, and type 5 is classified into another group, so that the type 2 generically represent the other group hereinafter. By configuring a lead-in area and a data area as mentioned above, two different manufacturing methods for the type 1 and type 2 can be allowed. Further, a tracking error signal can be continuously obtained when recording or reproducing a disc. Therefore, a recording or reproducing can be continuously performed without interruption. Accordingly, a DVD-RW disc can be increased in performance on value added without affecting a currently available reproducing apparatus for a DVD-ROM disc or a DVD video disc.

Furthermore, in the above-mentioned embodiments, the "boundary emboss zone 1" and the "boundary emboss zone 2" composed of a pit area of one track respectively is provided as an intermediate area allocated either between a read only area and a recording area or between a read only area and another read only area. However, It is apparent that the intermediate area can be composed of more than two tracks. As seen from FIG. 5, difference between the type 1 and the type 2 is minor. With defining such that both the "boundary emboss zone 1" being a boundary between a recording area and a read only area and the "boundary emboss zone 2" being another boundary between a first read only area and a second read only area are a boundary, which is not necessary to be recorded if an address can not be detected accurately, or which is not necessary to read out a reproduction signal accurately, the type 1 and the type 2 can be unified into a common format.

Fifth Embodiment

FIG. 12(a) shows a configuration of a lead-in area and a data area of an information recording medium according to a fifth embodiment of the present invention.

FIGS. 12(b) through 12(d) are comparison tables showing differences in structure between a type 6 and a type 7. In FIGS. 12(c) and 12(d), a wording WBL indicates wobbling.

In this configuration, a wobble signal is recorded in all areas and the wobble signal can be obtained from all the areas. In FIG. 12(a), the type 6 and the type 7 is corresponding to the type 4 shown in FIG. 11(a) with replacing the "boundary emboss zone 1" with a "boundary zone 1". In the type 6, the "boundary zone 1" is assigned to be a recordable groove area, which is recorded with a wobble signal and a LPP. In the type 7, the "boundary zone 1" is assigned to be an emboss pit area, which is recorded with a wobble signal but not recorded with a LPP. Further, a "boundary emboss zone 2" shown in FIG. 12(a) is assigned to be another emboss pit area, which is recorded with a wobbling signal and a LPP as same as those recorded in the "boundary emboss zone 1" and the "boundary emboss zone 2" in FIG. 11(a). In a case of the type 7, the "boundary emboss zone 2" is an area, wherein it is acceptable that a LPP can not be read out accurately although the LPP is recorded. An identification information such as a "type 6 flag" and a "type 7 flag" for identifying the type 6 or type 7 is prerecorded in a LPP or in a read only area such as a readable "control data zone".

By defining an area as mentioned above, the type 6 and the type 7 can be unified into a common format. Since there existed two cases of recording the area and reproducing the area then, by prerecording a wobble signal in the area although an address signal is not recorded in a LPP of the area, a speed signal of a spindle can be produced and an address signal of the LPP can be recorded by interpolating the address signal by using a specific circuit. Actually, in a case of recording the "boundary zone 1", as shown in FIG. 12(b), an ECC block of a latter half of two ECC blocks is assigned to be a "linking loss area" for the type 6 and a recording is performed up to the "linking loss area". In a case of the type 7, an ECC block of a first half of the two ECC blocks is assigned to be the "linking loss area" and a recording is performed up to the "linking loss area".

Further, by prerecording a wobble signal in the "boundary emboss zone 2" for a same reason as mentioned above, a recording clock signal for recording can be produced continuously and a speed signal for a spindle can also be produced. Accordingly, a recording and reproducing process can be assured with maintaining interchangeability between the type 6 and type 7. In this case, an offset signal may generate in a push-pull signal in an intermediate area and an offset signal in DC (direct current) may generate in a wobble signal. By using a certain method such that the offset signal is passed through a band pass filter, a wobble signal can be continuously obtained without any dropout, or the wobble signal can be formed with a minor dropout in a short period of time. Therefore, an affection of offset can be eliminated by interpolating continuity of a wobble signal by using a specific circuit. By configuring as mentioned above, interchangeability can be further maintained while recording and reproducing and a manufacturing method of two types of discs can be realized. Accordingly, such the format is advanced and promoted furthermore.

In addition thereto, it is common to all the embodiments that the "boundary emboss zone 1" or the "boundary zone 1" is formed as a pit in an intermediate area equivalent to one round of a disc. However, two ECC blocks allocated as the intermediate area is a larger area than one round of a disc slightly. Therefore, some sectors or some sync frames of the latter half of the ECC blocks are a readable area as same as the "control data zone" following the "boundary emboss zone 1" or the "boundary zone 1". Further, the area is provided with at least two sync frames, so that the "control data zone" can be read out from a head of the zone accurately by drawing a reproduction signal into a PLL (phase locked loop) circuit or by performing the sync detection between the two sync frames when reproducing the "control data zone". The "boundary emboss zone 2" is also formed as a pit in an intermediate area equivalent to one round of a disc. Two ECC blocks, which are allocated as the intermediate area, are a larger area than one round of a disc slightly. Accordingly, some sectors or some sync frames of the latter half of the ECC blocks are a readable area of enabling to read out a wobble signal and a LPP signal as same as the "unreadable emboss zone" following the "boundary emboss zone 2".

By formatting as mentioned above, an LPP or an information about the type 6 or the type 7 recorded in the "control data zone" is obtained by the "Write Mode" (recording operation) and the "Read Mode" (reproducing operation) shown in the left side of FIG. 12(a), wherein a same process as described in the embodiments mentioned above is omitted. In a case of the "Write Mode" of the type 6, the "Write Mode" performs recording up to a "linking loss area", which is a last ECC block of the "boundary zone 1", and then the "recording" mode is switched over to a "reading" mode. In the "reading gen wclk" mode, a wobble signal is read out from the "unreadable emboss with LPP" area and a clock for recording is produced, and then an address signal is produced from a LPP and a timing for recording is produced. After that, a "recording" mode starts again from the "buffer zone 2". In a case of the "Write Mode" of the type 7, the "Write Mode" performs recording up to a "linking loss area", which is a last ECC block preceding the "boundary zone 1", and then the "recording" mode is switched over to a "reading" mode. In the "reading gen wclk" mode, a wobble signal is read out from the "unreadable emboss with LPP" area and a clock for recording is produced, and then an address signal is produced from a LPP and a timing for recording is produced. After that, a "recording" mode starts again from the "buffer zone 2". If a recording medium of the type 7 is recorded by the method for the type 6 with assuming the recording medium as the type 6 without obtaining the information of the type 6 or type 7 recorded in the LPP or the "control data zone", the recording medium can be continuously recorded in accordance with a wobble signal, which can be continuously obtained, even though an LPP signal can not be obtained. In this particular case, a recorded signal can not be read out from the area when the area is reproduced. However, the recorded signal is an information of one track and is not an information recorded in an important information area, so that no problem may happen. In addition thereto, the "Read Mode" is a same as that of other embodiments mentioned above, so that its description is omitted.

Sixth Embodiment

Figure 13A:
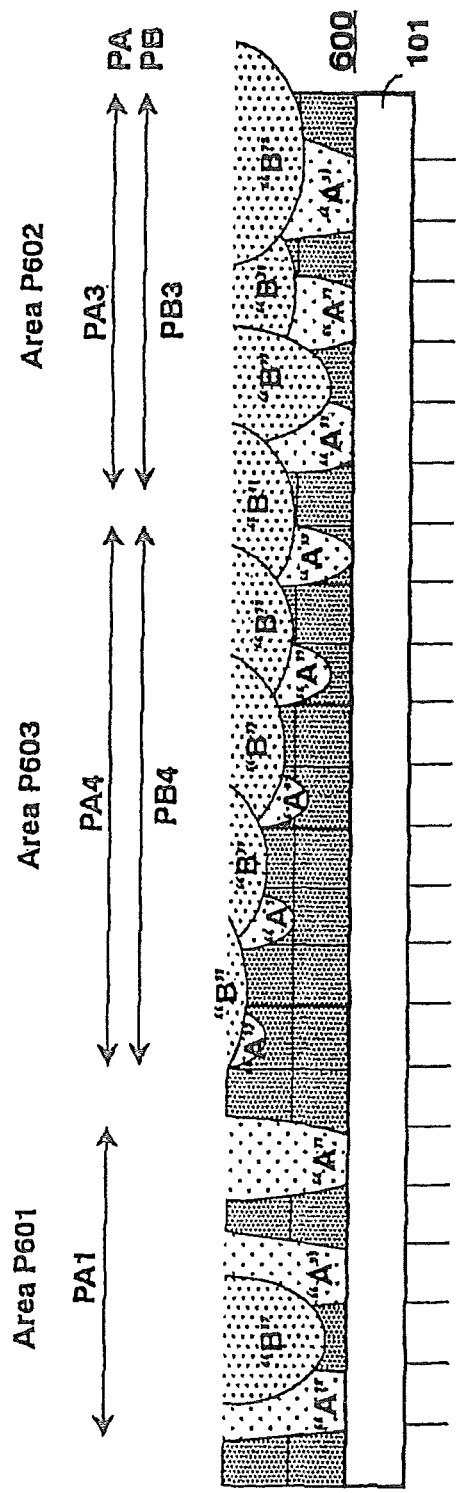
FIG. 13(a) is a partially enlarged cross sectional view of a resist board of an information recording medium according to a sixth embodiment of the present invention in a cutting state.

FIG. 13(a) is a partially enlarged cross sectional view of a resist board of an information recording medium according to a sixth embodiment of the present invention in a cutting state.

Figure 13B:
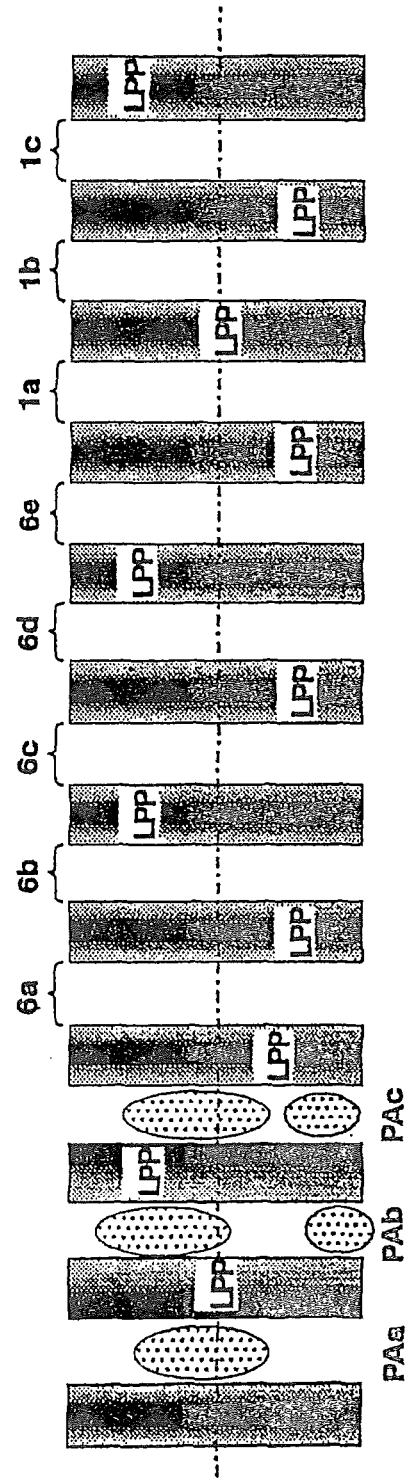
FIG. 13(b) is a partially enlarged plan view of the resist board shown in FIG. 13(a).

FIG. 13(b) is a partially enlarged plan view of the resist board shown in FIG. 13(a).

In the embodiments mentioned above, a bottom of each track is configured in a same depth. However, in the sixth embodiment shown in FIG. 13(a), an intermediate area (P603) is composed of guide grooves 6a through 6e (hereinafter generically referred to guide groove 6) having a different depth. A bottom of a guide groove area P603 gradually becomes shallower in a predetermined gradient from a direction of a guide groove area P602 (having guide grooves 1A through 1c) to a direction of a pit array area P601 having pit arrays PAa through PAc and a bottom of the pit array area P601 is a same as that of the guide groove area P602. Difference of a method of manufacturing such the depth configuration of the sixth embodiment from that of the prior art is as follows.

In the intermediate area P603 as a transitional area from the guide groove area P602 to the pit array area P601, wherein a bottom of a track is allocated on the top surface of a glass substrate 101, a condition of cutting a guide groove and a LPP by exposing a resist board 600 as deep as the top surface of the glass substrate 101 is utilized as an initial condition. A laser beam "A" contains a wobble signal. The laser beam "A" is swung or wobbled right and left horizontally by a light polarizing device (not shown) so as to be an amplitude of 15 nm on the resist board 600. An intensity of the laser beam "A" is regulated to an intensity PA3 such that a width of the guide groove "1" becomes 0.3 μm and a depth of the groove becomes approximately 30 nm. On the other hand, a laser beam "B" is regulated to an intensity PB3 so as to form a LPP (land pre-pit) in a depth of approximately 30 nm. A cutting process is performed by the constant linear velocity (CLV) method. A turntable (not shown) is controlled such that one rotation of the resist board 600 is equivalent to one track pitch and makes a movement of constant velocity by 0.74 μm from an inner circumference to an outer circumference of the resist board 600. Each output of the laser beams "A" and "B" is continuously changed while cutting a slanted portion of 3 tracks. While cutting the slanted portion, the laser beam "A" is controlled to be a specific beam strength suitable for recording a guide groove having a bottom of not reaching the top surface of the glass substrate 101, wherein a bottom of a guide groove is not exposed until the top surface of the glass substrate 101. A wobble signal shifts or wobbles the laser beam "B" right and left horizontally by a light polarizing device (not shown) so as to be an amplitude of 15 nm on the resist board 600. An intensity of the laser beam "B" is regulated to an intensity such that a width of a guide groove becomes 0.3 μm and a depth of the groove becomes approximately 30 nm. Further, the laser beam "B" is controlled to increase continuously up to specific beam strength suitable for forming a LPP on a side of a guide groove.

In the intermediate area P603 as a transitional area from the pit array area P601 to the guide groove area P602, wherein a bottom of a guide groove is allocated on the top surface of the glass substrate 101, it is defined as an initial condition such that the laser beam "A" is controlled to increase its beam strength continuously up to specific beam strength suitable for recording a guide groove, which is exposed until the top surface of the glass substrate 101, while cutting a slanted portion of 3 tracks by certain beam strength suitable for recording a guide groove having a bottom of not reaching the top surface of the glass substrate 101. With respect to the laser beam "B", its beam strength is continuously changed from certain beam strength suitable for forming a desired LPP to specific beam strength designated to form a LPP to be cut having a depth of approximately 30 nm while cutting a slant portion of 3 tracks.

In a track of a recordable intermediate area having a slant of a disc produced by the method mentioned above, offset may happen slightly by a tracking system of either the push-pull method or the differential push-pull method. However, the track can be recorded and reproduced. Since the track can not be recorded by the push-pull method as mentioned above, it is not necessary for the track to be composed of a pre-pit. Accordingly, the track can be designated to be a recordable area. Further, a tracking can be stably performed by the DPD method without any problem such as offset after the track as the recordable area is recorded. In the aforementioned embodiment, if an intermediate area composed of a pit area is overwritten, or due to a pit shape in the intermediate area, offset may happen by the DPD method. However, in the sixth embodiment, this kind of problem can be solved. Furthermore, both a wobble signal and an address signal of a LPP can be previously formed in the intermediate area. Accordingly, a recording operation of a signal to be recorded can almost accurately be performed and a reproducing operation of a reproduction signal can also stably be performed.

FIG. 14(a) shows a configuration of a lead-in area and a data area of the information recording medium according to the sixth embodiment of the present invention. FIGS. 14(b) and 14(c) are comparison tables showing differences between a type 6 and a type 8. In FIGS. 14(b) and 14(c), a wording WBL indicates wobbling.

In this configuration shown in FIGS. 14(a) through 14(c), a wobble signal is recorded in all areas and the wobble signal can be obtained from all the areas. A type 6 shown in FIG. 14(a) is substantially a same as the type 6 shown in FIGS. 12(b) and 12(c). Further, in a case of the type 7 shown in FIG. 12(c), the "boundary zone 1" is not recorded with an LPP as an emboss pit area although wobbling (WBL) is recorded in there. On the other hand, in a case of a type 8 shown in FIG. 14(a), a "boundary zone 1" is an area, which is slanted as mentioned above and recorded with wobbling (WBL) and an LPP as a recordable groove area, wherein it is not necessary for an LPP to be read out accurately although the LPP is allocated in the area. Furthermore, in a case of the type 7 shown in FIG. 12(d), the "boundary emboss zone 2" is recorded with WBL and an LPP as an emboss pit area. However, in a case of the type 8 shown in FIG. 14(c), an "boundary emboss zone 2" is an area, wherein it is not necessary for an LPP to be read out accurately although the LPP is recorded in the area. An identification information for identifying the type 6 or the type 8 is prerecorded in an LPP or in a read only area such as a "control data zone". The identification information can be defined by writing a code such as "0": without boundary and "1": with boundary, for example, in a "Media type 3" of a "Disc physical code" in an LPP information.

If the area is defined as mentioned above, the type 6 and the type 8 can be unified into a common format. In two cases of recording the area and reproducing the area then, a speed signal for a spindle can be produced by a wobble signal although an address signal of an LPP can not be detected in the intermediate area. Further, an address signal of the LPP can be recorded by interpolating the address signal by using a specific circuit. Actually, in a case of recording the "boundary zone 1", an ECC block at an address of "2F1F0h" is assigned to be a "linking loss area" for both the type 6 and the type 8, and then a recording is performed up to the "linking loss area".

Further, by prerecording a wobble signal in the "boundary emboss zone 2" for a same reason as mentioned above, a recording clock signal for recording can be produced continuously and a speed signal for a spindle can also be produced. Accordingly, a recording and reproducing process can be assured with maintaining interchangeability between the type 6 and type 8. In this case, an offset signal may generate in a push-pull signal in an intermediate area and an offset signal in DC may generate in a wobble signal. By using a certain method such that the offset signal is passed through a band pass filter, a wobble signal can be continuously obtained without any dropout, or the wobble signal can be formed with a minor dropout in a short period of time. Therefore, an affection of offset can be eliminated by interpolating continuity of a wobble signal by using a specific circuit. By configuring as mentioned above, interchangeability can be further maintained while recording and reproducing and a manufacturing method of two types of discs can be realized. Accordingly, such the format is advanced and promoted furthermore.

By formatting as mentioned above, an LPP or an information about the type 6 or the type 8 recorded in the "control data zone" is obtained by the "Write Mode" (recording operation) and the "Read Mode" (reproducing operation) shown in the left side of FIG. 14(a), wherein a same process as described in the embodiments mentioned above is omitted. In a case of the "Write Mode" of the type 6 and the type 8, the "Write Mode" is performed by recording up to a "linking loss area", which is a last ECC block of the "boundary zone 1", and then the "recording" mode is switched over to a "reading" mode. In the "reading gen wclk" mode, a wobble signal is read out from the "unreadable emboss with LPP" area and a clock for recording is produced, and then an address signal is produced from an LPP and a timing for recording is produced. After that, a "recording" mode starts again from the "buffer zone 2". Further, in a case of recording the "boundary zone 1" by the type 8 and using the push-pull method for tracking error, an offset signal generates in a tracking error signal within a permissible range. Therefore, by measuring an offset value previously when recording the "boundary zone 1", the "boundary zone 1" can be accurately recorded with controlling to cancel offset in response to the offset value. Furthermore, if a recording medium of the type 8 is recorded by the method for the type 6 with assuming the recording medium as the type 6 without obtaining the information of the type 6 or the type 8 recorded in the LPP or the "control data zone", the recording medium can be continuously recorded in accordance with a wobble signal, which can be continuously obtained, even though an LPP signal can not be obtained.

Seventh Embodiment

Figure 15:
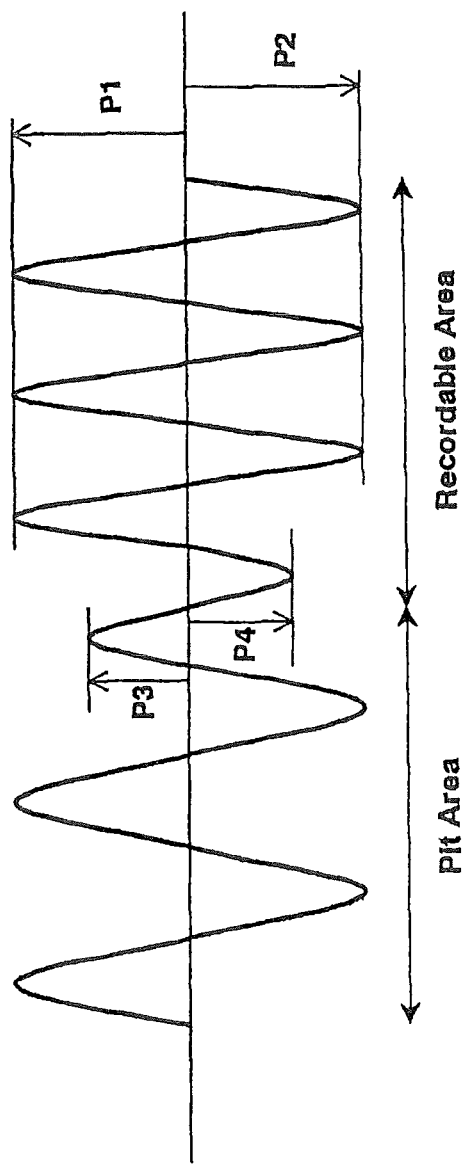
FIG. 15 is a waveform of a tracking error signal according to a seventh embodiment of the present invention.

FIG. 15 is a waveform of a tracking error signal according to a seventh embodiment of the present invention.

In this seventh embodiment of the present invention, it is depicted that a type of a disc equivalent to that of the sixth embodiment shown in FIGS. 14(a) through 14(c) is defined as the type 1 of the first embodiment shown in FIG. 5. Difference of the seventh embodiment from FIGS. 5 and 14(a) through 14(c) is as follows with considering the differences macroscopically. The type 6 shown in FIGS. 14(a) through 14(c) is corresponding to the type 6 shown in FIGS. 12(a) through 12(d). Further, the type 6 is substantially the same as the type 1 shown in FIG. 5 except for some zone names. In other words, the type 8 shown in FIGS. 14(a) through 14(c) is assigned to be a recordable groove area, which is slanted as mentioned above and recorded with WBL and an LPP, and to be a same area as the "buffer zone 1" of the type 1. Therefore, the type 8 can be defined or called as the "buffer zone 1". Similarly, the "boundary emboss zone 2" shown in FIGS. 14(a) through 14(c) is an emboss pit area recorded with WBL and an LPP and is a same area as the "unreadable emboss with LPP" area. Therefore, the boundary emboss zone 2" can be defined or called as the "unreadable emboss with LPP" area, wherein a reproduction signal can not be read out accurately from the area although an LPP signal can be read out. Further, the "unreadable emboss with LPP" area is utilized for servo controlling, so that the area can be called a "servo block".

By the above-mentioned definition, the type 6 and the type 8 shown in FIGS. 14(a) through 14(c) can use the same drawing as the type 1 shown in FIG. 5. However, the flags for indicating the type 6 and the type 8 are not existed in FIG. 5. Further, in two boundaries, where two boundary zones of the "boundary zone 1" and the "boundary emboss zone 2" are allocated, a tracking error signal particularly by the push-pull method may be different from an amplitude level and an offset level in a regular signal area, wherein a boundary track of the boundaries are such as a track between the "buffer zone 1" of a recordable area and the "control data zone" composed of a pit and one or more tracks allocated adjacent to another boundary between the "control data zone" and the "unreadable emboss with LPP" area of a read only track in which a reproduction signal composed of a pit can not be accurately read out from the area. By using the type 1 shown in FIG. 5, these two boundaries are expressed in other words. The two boundaries are such that a track between the "buffer zone 1" including the "linking loss area" being a recordable area and the "control data zone", which is composed of a pit, and one or more tracks allocated adjacent to another boundary between the "control data zone" and the "unreadable emboss with LPP" area being a read only track, wherein a reproduction signal composed of a pit can not be accurately read out. In these two boundaries, a tracking error signal particularly by the push-pull method may be different from an amplitude level and an offset level in a regular signal area.

In a recordable area and a read only area, amplitude of the tracking error signal by the push-pull method is basically different from each other. Amplitude of a tracking error signal is defined in the respective areas. As shown in FIG. 15, when a laser beam crosses a track particularly in a tracking off mode, amplitude of a tracking error signal by the push-pull method in a recordable area is designated such that a peak value in an upward direction is P1 and another peak value in a downward direction is P2 with standardizing a center voltage. Further, in a boundary between a pit area and the recordable area, peak values in an upward direction and a downward direction are defined as P3 and P4 respectively. Relations among the P1 through P4 are as follows:

$P3/(P1+P2) > 0.2$ and $P4/(P1+P2) > 0.2$.

The value 0.2 is necessary for stabilizing controls such as tracking while recording or reproducing the areas shown in FIG. 15 even when a tracking error signal by the push-pull method becomes smaller. Furthermore, the value 0.2 may vary by a measuring method, so that a range of 0.15 through 0.3 approximately is more desirable.

For instance, in a readable area other than the boundary shown in FIG. 15, an offset amount of amplitude of a tracking error signal is defined by a formula (P1−P2)/(P1+P2) as the asymmetry standard. When these two boundaries are defined by using the formula, in a case that amplitude of P1 and P2 are symmetrical with each other as shown in FIG. 15 and their amplitude are as small as unlimitedly, the formula (P1−P2)/(P1+P2) is satisfied. However, there existed a problem such that a tracking servo becomes unstable. In a case that amplitude of P3 and P4 are symmetrical with each other and their amplitude are small enough within a range of maintaining a tracking servo stable to the contrary, a disc can not be satisfied by a value of the formula (P1−P2)/(P1+P2). Therefore, a margin of manufacturing a disc is deteriorated. Accordingly, defining the boundary by introducing the two inequalities mentioned above is most desirable for a disc according to the seventh embodiment of the present invention.

By formatting mentioned above, the "Write Mode" (recording operation) and the "Read Mode" (reproducing operation) shown in FIG. 5 is performed in a sequence of operations shown in the left side of FIG. 5. However, at a time when a disc is discriminated as the disc of the type according to the seventh embodiment, the "Write Mode" performs recording up to the "linking loss area" with designating the "buffer zone 1" as the "linking loss area" of a last ECC block, wherein the "buffer zone 1" is equivalent to the "boundary zone 1" shown in FIG. 14(a). Further, an area adjacent to the "linking loss area" is a boundary as mentioned above. In a case that amplitude of a tracking error signal is small, an offset level of the tracking error signal may be different from that of other tracks. Therefore, by changing a gain and an offset control value during a tracking control, only when recording the boundary, a recording control can be performed stably. Furthermore, the offset control value can be altered by a result of reviewing an offset level of a tracking error signal previously measured in the boundary. The "Write Mode" is changed over to the "reading" mode thereafter, the "control data zone" is reproduced. Then, in the "reading gen wclk" mode, a wobble signal is read out from the "unreadable emboss with LPP" area, a clock for recording is produced, an address signal is produced from the LPP, and timing for recording is produced. Succeedingly, the "recording" mode restarts from the "buffer zone 2." An area covering the "control data zone" through the "unreadable emboss with LPP" area is also a boundary. In a case that amplitude of a tracking error signal in this boundary is small, an offset level of the tracking error signal may be different from that of other tracks. Therefore, by changing a gain and an offset control value during a tracking control, only when reading this boundary, a recording control can be performed stably. Further, the offset control value can be altered by a result of reviewing an offset level of a tracking error signal previously measured in this boundary. At a time when a disc is discriminated as the disc of the type according to the seventh embodiment, it is a regular method for the "control data zone" when being reproduced. The method is such that the "Read Mode" shown in FIG. 5 moves in a neighborhood of the "linking loss area" being a last ECC block of the "buffer zone 1" and a first area of the "control data zone" is reproduced, wherein the "buffer zone 1" is equivalent to the "boundary zone 1" shown in FIG. 14(a). In this case, an area adjacent to the "linking loss area" is a boundary as mentioned above. In a case that amplitude of a tracking error signal in this boundary is small, an offset level of the tracking error signal may be different from that of other tracks. Therefore, by changing a gain and an offset control value during a tracking control and by performing a recording control stably only when reading this boundary, the boundary can be passed through without any problem. Further, the offset control value can be altered by a result of reviewing an offset level of a tracking error signal previously measured in this boundary. In addition thereto, the boundary is recorded with an information having no meaning such as a data of totally "0" (zero). Therefore, the boundary can be skipped even though a data read out from the boundary becomes error. Accordingly, reproducing the "control data zone" obtains a necessary lead-in information and other information related to copyright protection, and then moving to the "data area" performs a reproduction process of contents.

While the invention has been described above with reference to specific embodiments thereof, it is apparent that many changes, modifications and variations in the arrangement of equipment and devices and in materials can be made without departing from the invention concept disclosed herein. For example, two boundaries are mentioned above. They can be existed both together or either one individually. Further, a boundary is either an area such as an intermediate area and a transitional area or a boundary between two areas. A tracking error in a boundary is different from that in respective two areas adjacent to the boundary. In addition thereto, a manufacturing method, configurations, and names of zones and areas are just utilized for explaining one embodiment. Accordingly, the present invention is not limited to such a manufacturing method, error correction format, and a disc configuration for one embodiment.

According to the aspect of the present invention, a boundary is provided either between a read only area and a recording area or between a read only area and another read only area, or a boundary is defined previously. A recording and reproducing signal characteristic can be improved. Further, the present invention is advantageous to eliminate problems such that an excessive offset signal may generates in a tracking error signal, a tracking error signal may drop off, and trackability may decrease while recording. Furthermore, the present invention has an advantage of such that a disc in a different type can also be recorded or reproduced without any problem.

What is claimed is:
1. A disc shaped information recording medium, comprising:
(a) a lead-in area provided in an inner circumferential side of the disc shaped information recording medium, the lead-in area including:
  (1) a first read only area in which information is formed in a plurality of information tracks in spiral as a first pit area in a unit of correction block,

(2) a second read only area in which information is formed in a plurality of tracks in spiral allocated in an outer circumferential side of the first read only area as a second pit area in a unit of correction block, wherein the second pit area is different from the first pit area in a physical characteristic, and (3) a third read only area in which information is formed in a plurality of tracks in spiral as a third pit area in a unit of correction block, allocated between the first pit area and the second pit area, wherein in order to track continuously the disc shaped information recording medium in an apparatus for reproducing the disc shaped information recording medium, the third pit area is formed such that a physical characteristic of at least three tracks in a plurality of tracks in the third pit area changes gradually from a physical characteristic in the first pit area to a physical characteristic in the second pit area so as to adjust a physical characteristic difference between the first pit area and the second pit area; and (b) an information track area provided in an outer circumferential side of the lead-in area in which information is recorded in a unit of correction block.

2. A reproducing method for reproducing the disc shaped information recording medium in accordance with claim 1, wherein information recorded on an information track in the information track area is reproduced on the basis of reproduction information reproduced from the first read only area.

3. A reproducing apparatus for reproducing the disc shaped information recording medium in accordance with claim 1, wherein information recorded on an information track in the information track area is reproduced on the basis of reproduction information reproduced from the first read only area.

4. A recording method for recording information on the disc shaped information recording medium in accordance with claim 1, wherein information is recorded on an information track in the information track area on the basis of reproduction information reproduced from the first read only area.

5. A recording apparatus for recording information on the disc shaped information recording medium in accordance with claim 1, wherein information is recorded on an information track in the information track area on the basis of reproduction information reproduced from the first read only area.

* * * * *